(12) United States Patent
Wada

(10) Patent No.: US 8,493,605 B2
(45) Date of Patent: Jul. 23, 2013

(54) PRINT CONTROL APPARATUS THAT ACQUIRES USER POSITION INFORMATION OF A PORTABLE TERMINAL

(75) Inventor: Masahiro Wada, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/434,198

(22) Filed: Mar. 29, 2012

(65) Prior Publication Data

US 2012/0188605 A1 Jul. 26, 2012

Related U.S. Application Data

(62) Division of application No. 12/148,541, filed on Apr. 17, 2008, now Pat. No. 8,446,619.

(30) Foreign Application Priority Data

Apr. 20, 2007 (JP) .................................. 2007-111474
Apr. 20, 2007 (JP) .................................. 2007-111514

(51) Int. Cl.
*G06F 3/12* (2006.01)

(52) U.S. Cl.
USPC ......... 358/1.15; 358/1.1; 358/1.13; 358/1.14; 358/1.16; 358/1.18

(58) Field of Classification Search
None
See application file for complete search history.

(56) References Cited

U.S. PATENT DOCUMENTS

| 7,298,508 | B2 | 11/2007 | Furukawa et al. | |
| 7,424,532 | B1* | 9/2008 | Subbiah | 709/226 |
| 2001/0038462 | A1* | 11/2001 | Teeuwen et al. | 358/1.15 |
| 2004/0008366 | A1* | 1/2004 | Ferlitsch | 358/1.15 |
| 2005/0024677 | A1* | 2/2005 | Miura et al. | 358/1.15 |
| 2005/0154884 | A1* | 7/2005 | Van Den Tillaart | 713/165 |
| 2005/0174609 | A1* | 8/2005 | Thurlow | 358/425 |
| 2006/0126118 | A1 | 6/2006 | Nagata | |
| 2007/0014612 | A1* | 1/2007 | Kim | 400/61 |
| 2007/0081541 | A1 | 4/2007 | Umekage et al. | |
| 2007/0127063 | A1* | 6/2007 | Fertlitsch et al. | 358/1.15 |
| 2007/0167173 | A1* | 7/2007 | Halcrow et al. | 455/456.2 |
| 2008/0225326 | A1* | 9/2008 | Kephart et al. | 358/1.15 |

FOREIGN PATENT DOCUMENTS

| JP | 2001-282488 | 10/2001 |
| JP | 2002-370407 | 12/2002 |
| JP | 2004-094777 | 3/2004 |
| JP | 2005-101722 | 4/2005 |
| JP | 2005-193408 | 7/2005 |
| JP | 2007-034493 | 2/2007 |
| WO | 2005/017738 | 2/2005 |

* cited by examiner

*Primary Examiner* — Miya J Cato
(74) *Attorney, Agent, or Firm* — Edwards Wildman Palmer LLP; David G. Conlin; Steven M. Jensen

(57) ABSTRACT

A print control apparatus in which a plurality of print apparatuses having a hold print function are caused to hold print data, and the print data of other print apparatuses other than a print apparatus print-instructed by a user is deleted, is provided. A print server is connected to the plurality of printers having a hold print function through a network. The print server includes a print data transmission portion that transmits print data received from a PC to printers to cause the printers to hold the print data, and a print data deletion instruction portion that, when a print notification of the print data is received from any one of the plurality of the printers, instructs other printers other than the printer to delete the print data.

3 Claims, 36 Drawing Sheets

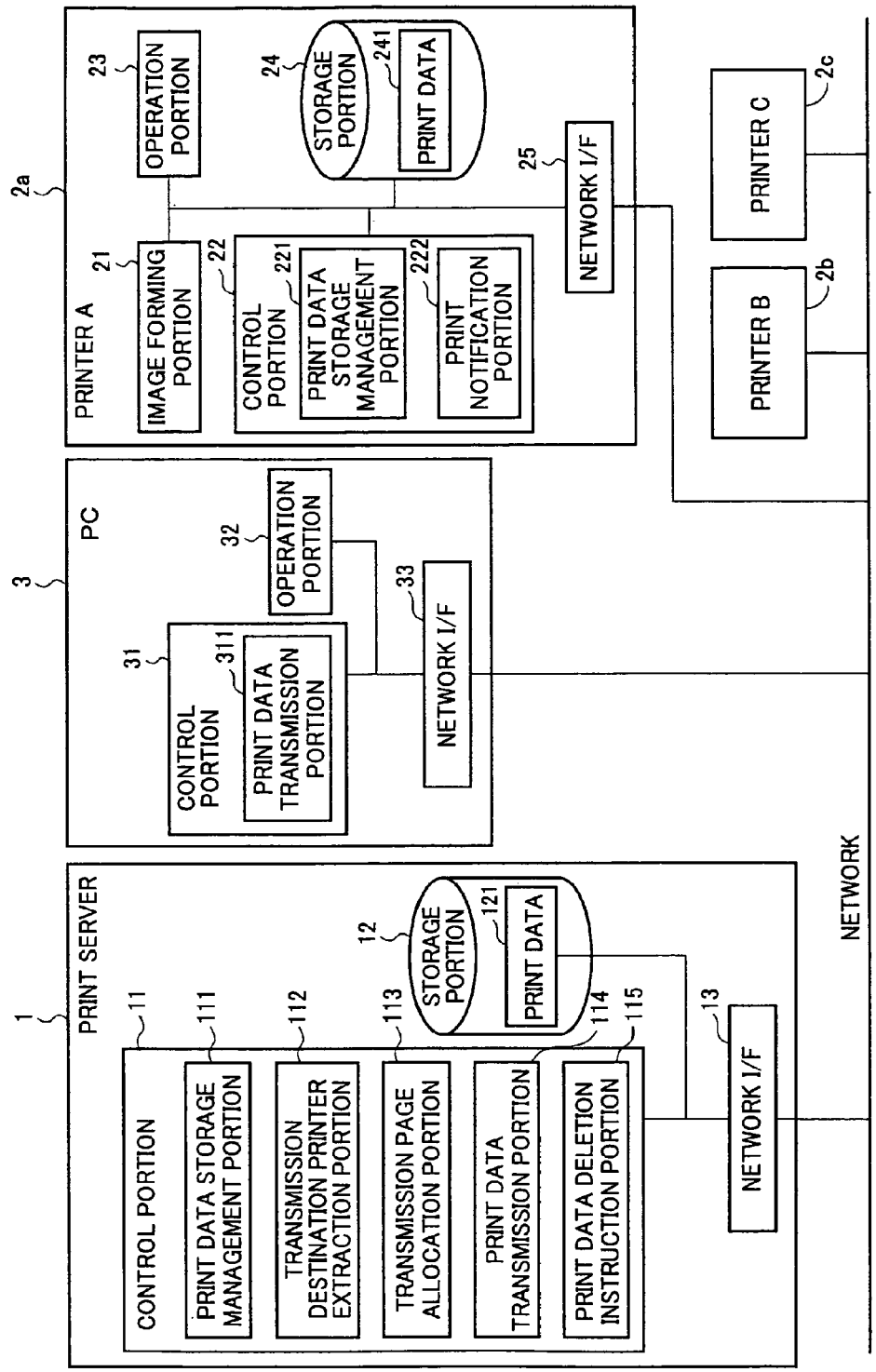

FIG.2A

| PRINT DATA ID | TRANSMISSION DESTINATION PRINTER | TRANSMISSION PAGE | PRINT DATA |
|---|---|---|---|
| 001 | IP ADDRESS 1<br>IP ADDRESS 2 | 10<br>5 | ×××.jpg |
| 002 | ……… | … | ……… |
|  |  |  |  |
|  |  |  |  |

FIG.2B

| TRANSMISSION DESTINATION PRINTER | STATE INFORMATION | | |
|---|---|---|---|
|  | PROCESSING CAPABILITY | JOB STATE | COMMUNICATION STATE |
| IP ADDRESS 1 | HIGH | WAITING JOB:3 | EXCELLENT |
| IP ADDRESS 2 | LOW | WAITING JOB:0 | SLIGHTLY CONGESTED |
|  |  |  |  |

FIG.20

| PRINT DATA ID | PORTABLE TERMINAL | USER POSITION | TRANSMISSION DESTINATION PRINTER | TRANSMISSION PAGE | PRINT DATA |
|---|---|---|---|---|---|
| 001 | ○○×@abc.ne.jp | ① (135.00, )<br>② (○○○.○○, △△.△△)<br>③ …… | IP ADDRESS 1<br>IP ADDRESS 2 | 10<br>5 | ×××.jpg |
| 002 | …… | …… | …… | …… | …… |
| | | | | | |

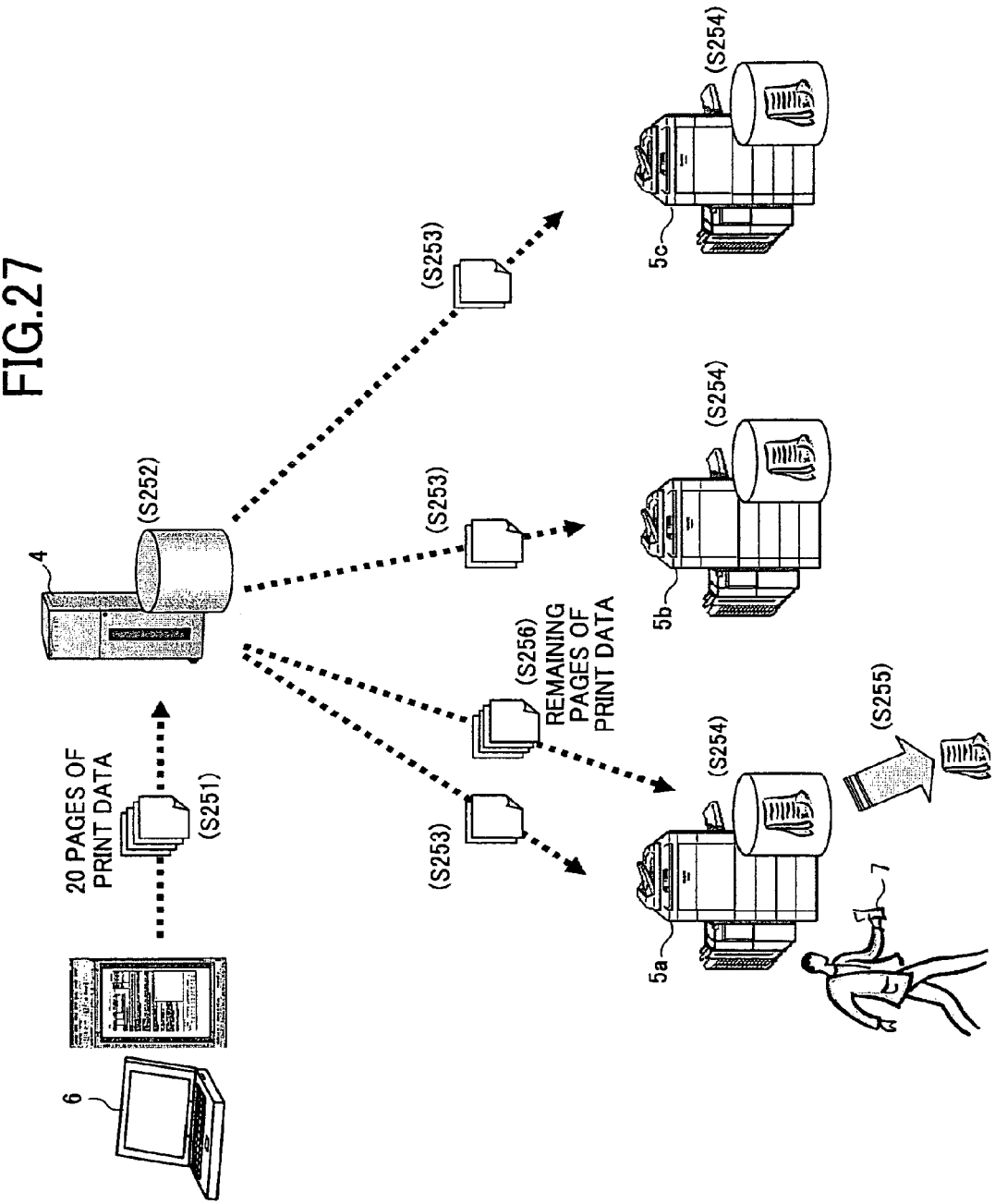

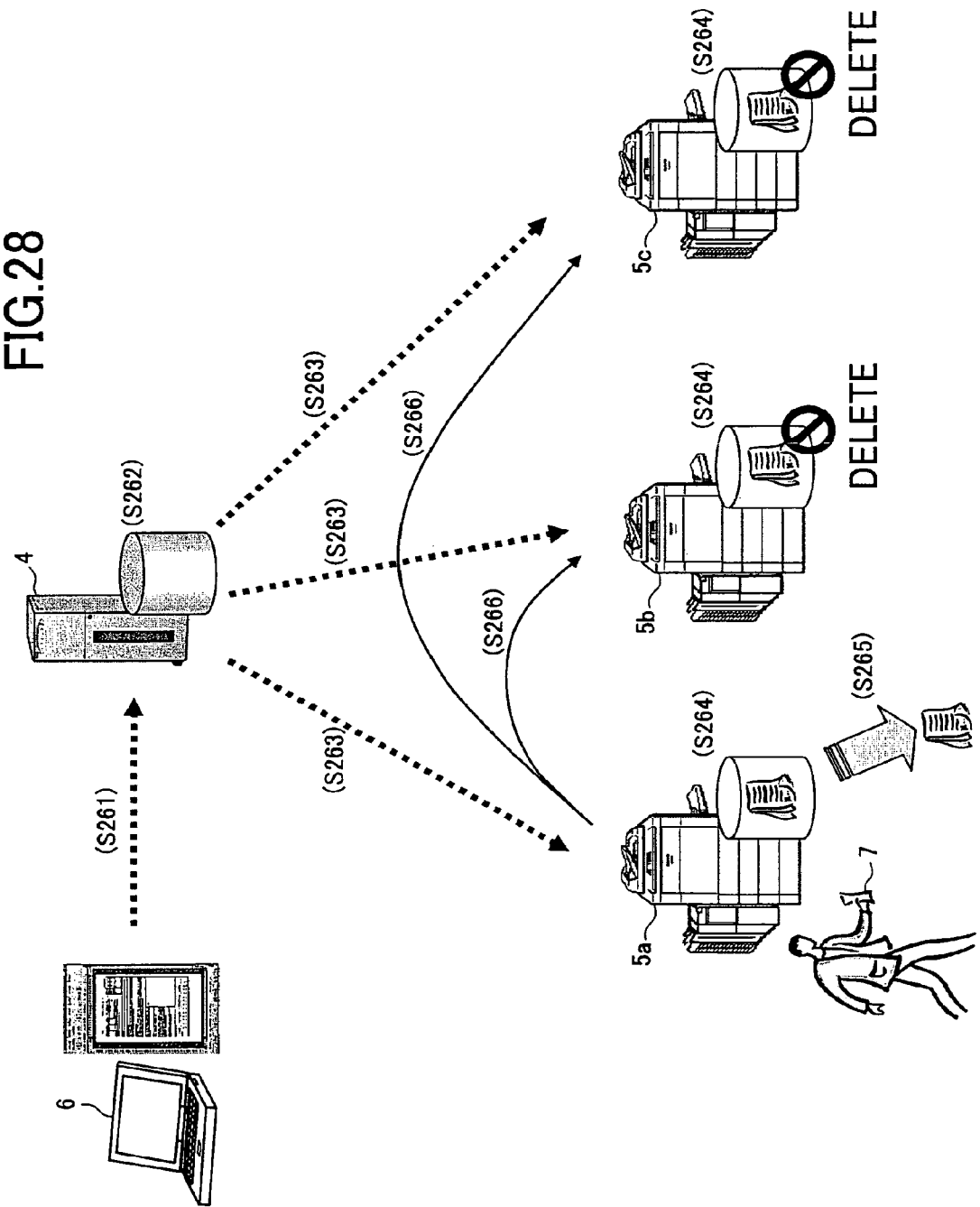

PRINT CONTROL APPARATUS THAT ACQUIRES USER POSITION INFORMATION OF A PORTABLE TERMINAL

CROSS-NOTING PARAGRAPH

This application is a divisional of copending application U.S. Ser. No. 12/148,541 filed on Apr. 17, 2008, which claims priority under 35 U.S.C. §119(a) to Japanese Patent Application No. 2007-111474 filed on Apr. 20, 2007 and Japanese Patent Application No. 2007-111514 filed on Apr. 20, 2007, the entire contents of which are hereby incorporated herein by reference.

FIELD OF THE INVENTION

The present invention relates to a print control apparatus, a print control system, a print apparatus, and more specifically, relates to a print control apparatus, a print control system and a print apparatus, that transmit print data to a plurality of print apparatuses having a hold print function.

BACKGROUND OF THE INVENTION

Print apparatuses (printers) having a hold print function are generally used. According to the hold print function, print data print-instructed by a user is temporarily held on a hard disc in a printer. When the user inputs such as a password to the printer at a desired timing, then the print data can be printed out.

By using the hold print function, only specified user who knows the password can perform a print output at a desired timing, thus making it possible to attain the protection of the security for such as important documents and confidential documents. Further, it is also possible to delete the print data as it is from the printer without printing out, when the print data becomes unnecessary after having made the print instruction.

On the other hand, increasing number of companies etc, use a PC (personal computer) for transmitting print data, a print server, and a plurality of printers by connecting to a network. A technology that a print server transmits print data received from a PC simultaneously to a plurality of printers to perform a parallel printing in such a network environment, has been known (refer to, for example, Japanese Laid-Open Patent Publication No. 2001-282488).

In the technology described in Japanese Laid-Open Patent Publication No. 2001-282488, a multicast transmission of print data is performed as a packet to a plurality of network printers, and a state of packet transmission/reception in the network printers subject to the multicast transmission is monitored, to thereby perform a control of a transmission, a stand-by, and a retransmission of the packet.

Further, in PCT publication No. WO2005/17738, a technology that a plurality of printers are inquired as to the possibility of a printing and print data is transmitted to the printer that has answered that the printing is possible, is disclosed. According to the technology, the print data is transmitted to the printer capable of printing, resulting that the printing can be performed surely.

In addition, in such a network environment, when it is considered that a print service is provided to users moving in an office or a factory, it is not necessarily efficient for users moving very often to make only a specified printer as an output destination. For example, in many cases it is more efficient that a printer that is located on the way to a destination is made as the output destination.

For example, in Japanese Laid-Open Patent Publication No. 2004-94777, a print service for users moving in a network environment is proposed. In the print service, a printer to be an output destination is determined in consideration of a moving route or a moving time of a user, and a printing time by a printer.

However, the technology described in Japanese Laid-Open Patent Publication No. 2001-282488 is not for a printer having a hold print function, and therefore all of print data transmitted to a plurality of printers are printed out without being held temporarily. In addition, the technology described in PCT publication No. WO2005/17738 is also not for a printer having a hold print function, and therefore print data transmitted to a printer capable of printing is printed out without being held temporarily. Thus, when a user carelessly forgets that the user has made a print instruction to a printer, a printed matter is left in the printer, causing a risk that important information is leaked to a third person if the printed matter is such as a confidential document.

In the conventional technologies as described above, it has not been considered to perform a hold printing when a plurality of printers are connected in the network environment. In other words, a use form that a plurality of printers having a hold print function are connected to a network, and print data is simultaneously transmitted for the network to cause each of the printers to hold the print data, has not been considered. If such a use form is realized, a user is allowed to print out necessary print data by inputting a password in any printer on the network, thus making it possible to improve usability for a user and to attain a protection of confidential information.

In addition, when a user causes a desired printer to perform a print output, print data that is held by other printers on the network becomes unnecessary. Remaining the unnecessary print data in the printers causes a waste use of a disc capacity, and it is not desirable in terms of the security. Conventionally, in order to delete print data from a printer, a method of deleting the print data directly from the printer to which the user has transmitted the print data, or a method of sending an instruction to delete the print data in the printer from a PC of the user, has been required, causing a problem that a deleting operation takes a time.

Further, in the technology described in Japanese Laid-Open Patent Publication No. 2004-94777, it is not considered that a hold printing is performed when a plurality of printers are connected in the network environment. In other words, a use form that a plurality of printers having a hold print function are connected to a network, and print data is transmitted to the printers on the network to be held by the printers, has not been considered. Thus, when a user carelessly forgets that the user has made a print instruction to a printer, a printed matter is left in the printer, causing a risk that important information is leaked to a third person if the printed matter is such as a confidential document. That is the case especially when a printer at a remote place such as a movement destination of a user becomes an output destination.

In addition, when print data is held by a plurality of printers on a network and a user causes a desired printer to perform a print output, the print data held by other printers on the network becomes unnecessary. Remaining the unnecessary print data in the printer causes a waste use of a disc capacity, and it is not desirable in terms of the security. Conventionally, in order to delete print data from a printer, a method of deleting the print data directly from the printer to which the user has transmitted the print data, or a method of sending an instruction to delete the print data in the printer from a PC of the user, has been required, causing a problem that a deleting operation takes a time.

Further, in the technology described in Japanese Laid-Open Patent Publication No. 2004-94777, an output destination printer can not be determined unless a migration route of a user is known in advance. Accordingly, when the user changes the migration route, there arises a problem that an output destination printer can not be determined unless the migration route is registered each time.

SUMMARY OF THE INVENTION

The object of the present invention is to provide a print control apparatus, a print control system and a print apparatus, in which a plurality of print apparatuses having a hold print function are caused to hold print data, and the print data in other print apparatuses other than a print apparatus print-instructed by a user is deleted.

Further, an object of the present invention is to provide a print control apparatus and a print apparatus, in which two or more print apparatuses near a user position among a plurality of print apparatuses having a hold print function are caused to hold print data, and the print data in print apparatuses other than a print apparatus print-instructed by a user is deleted.

Another object of the present invention is a print control apparatus that is connected to a plurality of print apparatuses having a hold print function through a network, comprising: a print data transmission portion that transmits print data received from a user terminal to the plurality of print apparatuses to cause the plurality of print apparatuses to hold the print data; and a print data deletion instruction portion that, when a print notification of the print data is received from any one of the plurality of print apparatuses, instructs other print apparatuses other than the print apparatus to delete the print data.

Another object of the present invention is the print control apparatus, wherein the print data transmission portion transmits a part of the print data to the plurality of print apparatuses in accordance with a printing order of the print data to cause the plurality of print apparatuses to hold the part of the print data.

Another object of the present invention is the print control apparatus, further comprising a storage portion that stores each of state information of the plurality of print apparatuses, wherein the print data transmission portion differentiates a transmission amount of the print data to each of the plurality of print apparatuses depending on the state information stored in the storage portion.

Another object of the present invention is the print control apparatus, wherein the state information is a print performance or a print function included in each of the plurality of print apparatuses.

Another object of the present invention is the print control apparatus, wherein the state information is a job state that each of the plurality of print apparatuses receives.

Another object of the present invention is the print control apparatus, wherein the state information is a communication state about a network to which each of the plurality of print apparatuses is connected.

Another object of the present invention is the print control apparatus, wherein in a case where the plurality of print apparatuses hold the part of the print data, when a print notification of the print data is received from any one of the plurality of print apparatuses, the print data transmission portion transmits remaining data of the print data to the print apparatus.

Another object of the present invention is the print control apparatus, wherein when the print notification of the print data is received from any one of the plurality of print apparatuses, the print data deletion instruction portion instructs the other print apparatuses other than the print apparatus to delete an amount of the print data that a printing is completed by the print apparatus, based on information, included in the print notification, of the amount of the print data that the printing is completed by the print apparatus.

Another object of the present invention is the print control apparatus, wherein in a case where the plurality of print apparatuses hold the part of the print data, when the print notification of the print data is received from any one of the plurality of print apparatuses, the print data transmission portion transmits remaining data of the print data to the other print apparatuses other than the print apparatus, and the print data deletion instruction portion instructs the other print apparatuses to delete an amount of the print data that a printing is completed by the print apparatus, based on information, included in the print notification, of the amount of the print data that the printing is completed by the print apparatus.

Another object of the present invention is a print control apparatus that is connected to a plurality of print apparatuses having a hold print function through a network, comprising: a user position information acquisition portion that acquires user position information; a print apparatus extraction portion that extracts two or more print apparatuses near the user position based on the acquired user position information; a print data transmission portion that transmits print data received from a user terminal to each of the print apparatuses extracted by the print apparatus extraction portion to cause each of the print apparatuses to hold the print data; a print data deletion instruction portion that, when a print notification of the print data is received from any one of each of the print apparatuses, instructs other print apparatuses other than the print apparatus to delete the print data.

Another object of the present invention is the print Control apparatus, wherein the print data transmission portion transmits a part of the print data to each of the print apparatuses in accordance with a printing order of the print data to cause each of the print apparatuses to hold the part of the print data.

Another object of the present invention is the print control apparatus, wherein the print data transmission portion differentiates a transmission amount of the print data to each of the print apparatuses depending on a distance between the user position based on the user position information and each of the print apparatuses.

Another object of the present invention is the print control apparatus, wherein in a case where each of the print apparatuses holds the part of the print data, when a print notification of the print data is received from any one of each of the print apparatuses, the print data transmission portion transmits remaining data of the print data to the print apparatus.

Another object of the present invention is the print control apparatus, wherein when the print notification of the print data is received from any one of each of the print apparatuses, the print data deletion instruction portion instructs the other print apparatuses other than the print apparatus to delete an amount of the print data that a printing is completed by the print apparatus, based on information, included in the print notification, of the amount of the print data that the printing is completed by the print apparatus.

Another object of the present invention is the print control apparatus, further comprising a storage portion that stores a history about the user position information acquired by the user position information acquisition portion, wherein when the user position information acquired by the user position information acquisition portion and previous user position information stored in the storage portion are different, the print apparatus extraction portion extracts new print apparatuses to be a transmission destination of the print data.

Another object of the present invention is the print control apparatus, wherein when the new print apparatuses are extracted by the print apparatus extraction portion, the print data deletion instruction portion instructs the print apparatuses extracted based on the previous user position information to delete the print data.

Another object of the present invention is the print control apparatus, wherein the print apparatus extraction portion acquires information about a migration route of a user from the history of the user position information stored in the storage portion to extract the print apparatuses to be the transmission destination of the print data based on the information about the migration route.

Another object of the present invention is the print control apparatus, wherein the print data transmission portion weights an amount of the print data to be transmitted to each of the print apparatuses extracted by the print apparatus extraction portion based on the information about the migration route.

Another object of the present invention is the print control apparatus, wherein the user position information acquisition portion communicates with a portable terminal having a GPS function used by a user to acquire the user position information.

Another object of the present invention is a print control system provided with a plurality of print apparatuses having a hold print function, and a print control apparatus that is connected to the plurality of print apparatuses through a network, wherein the print control apparatus includes a print data transmission portion that transmits print data received from a user terminal to the plurality of print apparatuses to cause the plurality of print apparatuses to hold the print data, and in the plurality of print apparatuses, when a print notification of the print data is transmitted from any one of the plurality of print apparatuses to other print apparatuses by a user operation, the other print apparatuses delete the print data in response to the print notification.

Another object of the present invention is a print apparatus that is connected to a user terminal through a network, comprising: a network interface that is connected to other plurality of print apparatuses having a hold print function through a network; a print data transmission portion that transmits print data received from the user terminal to the plurality of other print apparatuses to cause the other plurality of print apparatuses to hold the print data; and a print data deletion instruction portion that, when a print notification of the print data is received from any one of the other plurality of print apparatuses, instructs other print apparatuses other than the print apparatus to delete the print data.

Another object of the present invention is the print apparatus that is connected to the print control apparatus through the network, further comprising:
a storage portion that stores the print data transmitted from the print control apparatus; a print instruction portion that performs a print instruction with respect to the print data stored in the storage portion;
a print portion that executes a print processing of the print data by the print instruction from the print instruction portion; and a print notification portion that, when the print processing by the print portion is interrupted, notifies information of an amount of the print data that the printing is completed before interrupting the printing.

Another object of the present invention is the print apparatus, wherein the print portion interrupts the print processing based on a print stop command by a user, or an error during printing.

Another object of the present invention is a print apparatus that is connected to a user terminal through a network, comprising: a network interface that is connected to other plurality of print apparatuses having a hold print function through a network; a user position information acquisition portion that acquires user position information; a print apparatus extraction portion that extracts two or more other print apparatuses near the user position based on the acquired user position information; a print data transmission portion that transmits print data received from the user terminal to the each of other print apparatuses extracted by the print apparatus extraction portion to cause each of the other print apparatuses to hold the print data; and a print data deletion instruction portion that, when a print notification of the print data is received from any one of each of the other print apparatuses, instructs other print apparatuses other than the print apparatus to delete the print data.

Another object of the present invention is the print apparatus connected to the print control apparatus through the network, further comprising: a storage portion that stores the print data transmitted from the print control apparatus; a print instruction portion that performs a print instruction with respect to the print data stored in the storage portion; a print portion that executes a print processing of the print data by the print instruction from the print instruction portion; and a print notification portion that, when the print processing by the print portion is interrupted, notifies information of an amount of the print data that the printing is completed before interrupting the printing.

BRIEF DESCRIPTION OF THE DRAWINGS

FIG. 1 is a block diagram showing an exemplary configuration of a print control system provided with a print control apparatus of the present invention;

FIGS. 2A and 2B are diagrams showing an example of management tables stored in a storage portion of a print server;

FIG. 20 is a diagram showing an example of a print data management table stored in the storage portion of the print server;

FIG. 27 is a diagram for explaining another example of the hold print processing flow according to the print control system of the present invention;

FIG. 28 is a diagram for explaining another example of the hold print processing flow according to the print control system of the present invention;

PREFERRED EMBODIMENTS OF THE INVENTION

Figure 3:
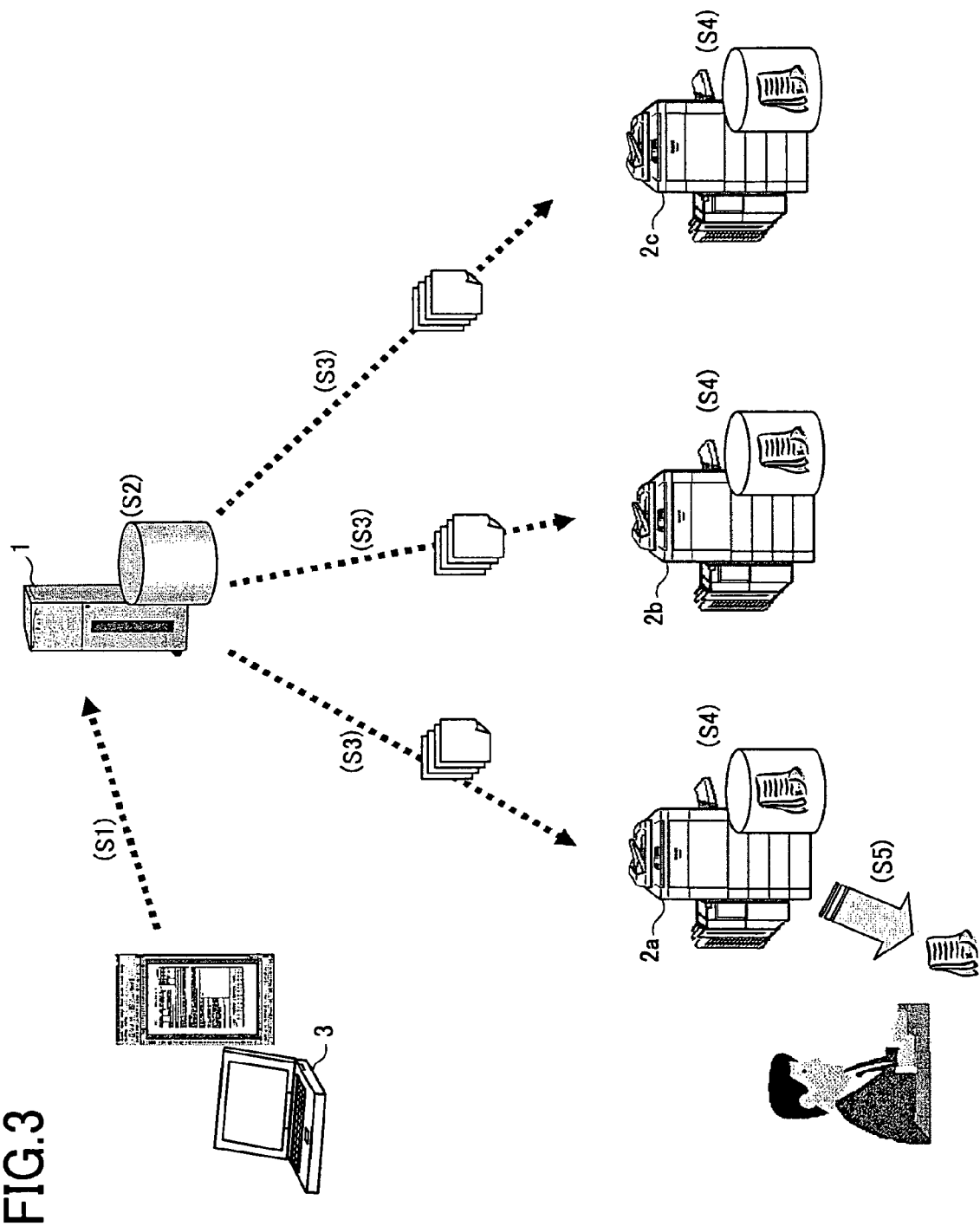
FIG. 3 is a diagram for explaining an example of a hold print processing flow according to the print control system of the present invention.

FIG. 1 is a block diagram showing an exemplary configuration of a print control system provided with a print control apparatus of the present invention. 1 denotes a print server that corresponds to the print control apparatus of the present invention, 2a to 2c denote printers that correspond to the print apparatus of the present invention, and 3 denotes a PC that corresponds to a user terminal of the present invention. The print server 1, the printers 2a to 2c, and the PC 3 are connected through a network, and any of the printers 2a to 2c have a hold print function.

The print server 1 includes a control portion 11 that is constituted by such as a CPU, a ROM, and a RAM, and that controls operations of devices; a storage portion 12 that is constituted by such as a hard disc and a nonvolatile memory; and a network I/F 13 that is connected to the printers 2a to 2c and the PC 3 through a network. In addition, the control portion 11 is constituted by a print data storage management portion 111 that stores and manages print data 121 transmitted from the PC 3 in the storage portion 12; a transmission destination printer extraction portion 112 that extracts printers to be a transmission destination of the print data 121; a transmission page allocation portion 113 that performs an allocation of pages to transmit to each of the printers; a print data transmission portion 114 that transmits the print data 121 simultaneously to each of the printers; and a print data deletion instruction portion 115 that transmits a deletion command of print data to other printers if a print notification is made from a printer print-instructed by a user.

Each of the portions included in the control portion 11, i.e., the print data storage management portion 111, the transmission destination printer extraction portion 112, the transmission page allocation portion 113, the print data transmission portion 114, and the print data deletion instruction portion 115, are constituted as an executable print control program by the print server 1. The print control program is stored in the storage portion 12 etc., and read by the control portion 11 in executing the program to be executed appropriately.

Further, the PC 3 includes a control portion 31 that is constituted by such as a CPU, a ROM, and a RAM, and that controls operations of devices; an operation portion 32 that performs such as an operation of transmitting print data; and a network I/F 33 that is connected to the printers 2a to 2c and the print server 1 through a network. Further, the control portion 31 includes a print data transmission portion 311 serving as a printer driver, and that transmits print data to the print server 1 depending on an operation instruction from the operation portion 32.

In FIG. 1, when the print server 1 receives the print data 121 transmitted from the control portion 31 of the PC 3 on the network, the print data storage management portion 111 stores the print data 121 in the storage portion 12. When the print data 121 is stored in the storage portion 12, the transmission destination printer extraction portion 112 of the print server 1 extracts printers to be a transmission destination of the print data 121. For example, all of the printers on the same network may be extracted.

The transmission page allocation portion 113 allocates the number of pages of the print data to be transmitted to each of the printers extracted by the transmission destination printer extraction portion 112. For example, the number of pages of print data may be increased in the case of a high-speed printer so that a print processing time after a print instruction to the high-speed printer was made is shortened.

The print data transmission portion 114 transmits the allocated page number of print data by the transmission page allocation portion 113 to each of the printers. The print data transmission portion 114 causes each of the printers to hold the print data if an instruction of a hold print is made from the PC 3. Herein, the print data transmission portion 114 may transmit the print data by developing into a common bitmap format to each of the printers to be a transmission destination of the print data, or by previously storing information of a printer language (PDL: Page Description Language) corresponding to each of the printers and converting the print data depending on printer languages of each of the printers. In the former case, the print data is subject to a broadcast transmission in which no printer is specified, and in the latter case, the print data is subject to a multicast transmission in which each of the printers is specified.

When a print notification (print completion notification or print start notification) of the print data is received from the printer print-instructed by a user among the plurality of printers to which the print data is transmitted by the print data transmission portion 114, the print data deletion instruction portion 115 instructs the other printers on the network other than the printer to delete the print data. Thereby, the print data stored in other printers is automatically deleted.

Although exemplary configurations of the printers 2a to 2c connected to the print server 1 will be described below, the printer 2a will be shown as a representative example because the basic structures are same in each of the printers.

The printer 2a includes an image forming portion 21 that performs a print processing of print data; a control portion 22 that is constituted by such as a CPU, a ROM, and a RAM, and that controls operations of devices; an operation portion 23 that performs such as an operation of printing print data; a storage portion 24 constituted by such as a hard disc, that stores print data 241; and a network I/F 25 that is connected to the print server 1 and the PC 3 through a network. Further, the control portion 22 is constituted by a print data storage management portion 221 that stores and manages the print data 241 transmitted from the print data transmission portion 114 of the print server 1 in the storage portion 24; and a print notification portion 222 that transmits a print start notification or a print completion notification to the print server 1 or other printers when a print instruction is made by a user.

When the operation portion 23 receives a print instruction of the print data 241 stored in the storage portion 24 from a user, the printer 2a performs a print processing of the print data 241 by the image forming portion 21. In the case of a hold printing, a password is input from such as ten keys included in the operation portion 23 by the user, and an authentication processing thereof is performed by the control portion 22. Password information associated with the print data is previously transmitted together with the print data to each of the printers from the print server 1, and held by each of the printers.

When the print processing is completed by the image forming portion 21, the print notification portion 222 performs a completion notification of the print processing to the print server 1. At this time, the print notification portion 222 may perform the print completion notification not only in the print job units, but for every page that the printing is completed, or for every predetermined page. Further, the print notification portion 222 may perform a start notification of the print processing to the print server 1 when the print processing is started by the image forming portion 21. Hereinafter, the print completion notification or the print start notification is referred to as a print notification. The print notification may include information of the amount of print data that the printing is completed (for example, print completion to page 2).

FIGS. 2A and 2B are diagrams showing an example of management tables stored in the storage portion 12 of the print server 1. FIG. 2A shows an example of a print data management table, and FIG. 2B shows a printer management table. The print data transmission portion 114 of the print server 1 controls a transmission processing of print data based on these management tables stored in the storage portion 12.

The print data management table shown in FIG. 2A manages such as a transmission destination printer, a transmission page, and a type of print data, with respect to each of print data. According to the example, in the print data of "001", 10 pages are transmitted to a printer with an IP address 1, and 5 pages are transmitted to a printer with an IP address 2. In this way, the print data transmission portion 114 may transmit a part of the print data in accordance with a printing order of the print data to the printer, causing the printers to hold the part of the print data.

The printer management table shown in FIG. 2B manages such as a processing capability (a print performance or a print function), a job state, and a communication state, as status information, with respect to each of the printers. The print data transmission portion 114 may differentiate the transmission amount of print data to each of the printers corresponding to this status information. Examples of the processing capability include a printing speed of a printer. In this case, the transmission amount of print data to a high-speed printer is increased, and the transmission amount of print data to a low-speed printer is reduced. In addition, a management table about print functions (such as a hold print function, a sorting function, a staple function, and a color print function) of each of the printers may be provided so that print data is output by a printer having a function that is specified by a user with a printer driver of the PC 3.

Further, the job state is, for example, the number of waiting print jobs being received by each of the printers, and can be obtained periodically or at an arbitrary timing from each of the printers. In this case, the transmission amount of print data to a printer having a smaller number of the waiting print jobs is increased, and the transmission amount of print data to a printer having a larger number of the waiting print jobs is reduced. In addition, the communication state is, for example, a communication state of a network for connecting the print server 1 and each of the printers, and can be obtained by transmitting a "ping" command from the print server 1. In this case, the transmission amount of print data to a printer having an excellent communication state is increased, and the transmission amount of print data to a printer having a deteriorated communication state because of such as traffic congestion is reduced. Further, the transmission amount of print data may be differentiated depending on a transmission band on a network to which each of the printers is connected.

FIG. 3 is a diagram for explaining an example of a hold print processing flow according to the print control system of the present invention. First, when a user performs a print operation from the PC 3, all of the print data is transmitted to the print server 1 (S1), and the print server 1 stores the print data from the PC 3 in the storage portion 12 (S2). The print server 1 transmits the print data (herein, all pages of the print data) stored in the storage portion 12 simultaneously to each of the printers 2a, 2b and 2c (S3). Each of the printers 2a, 2b and 2c stores the print data received from the print server 1 in storage portions (S4).

Then, in the case of the present example, the user inputs a password from the operation portion 23 of the printer 2a to print out necessary print data from the printer 2a (S5).

Figure 4:
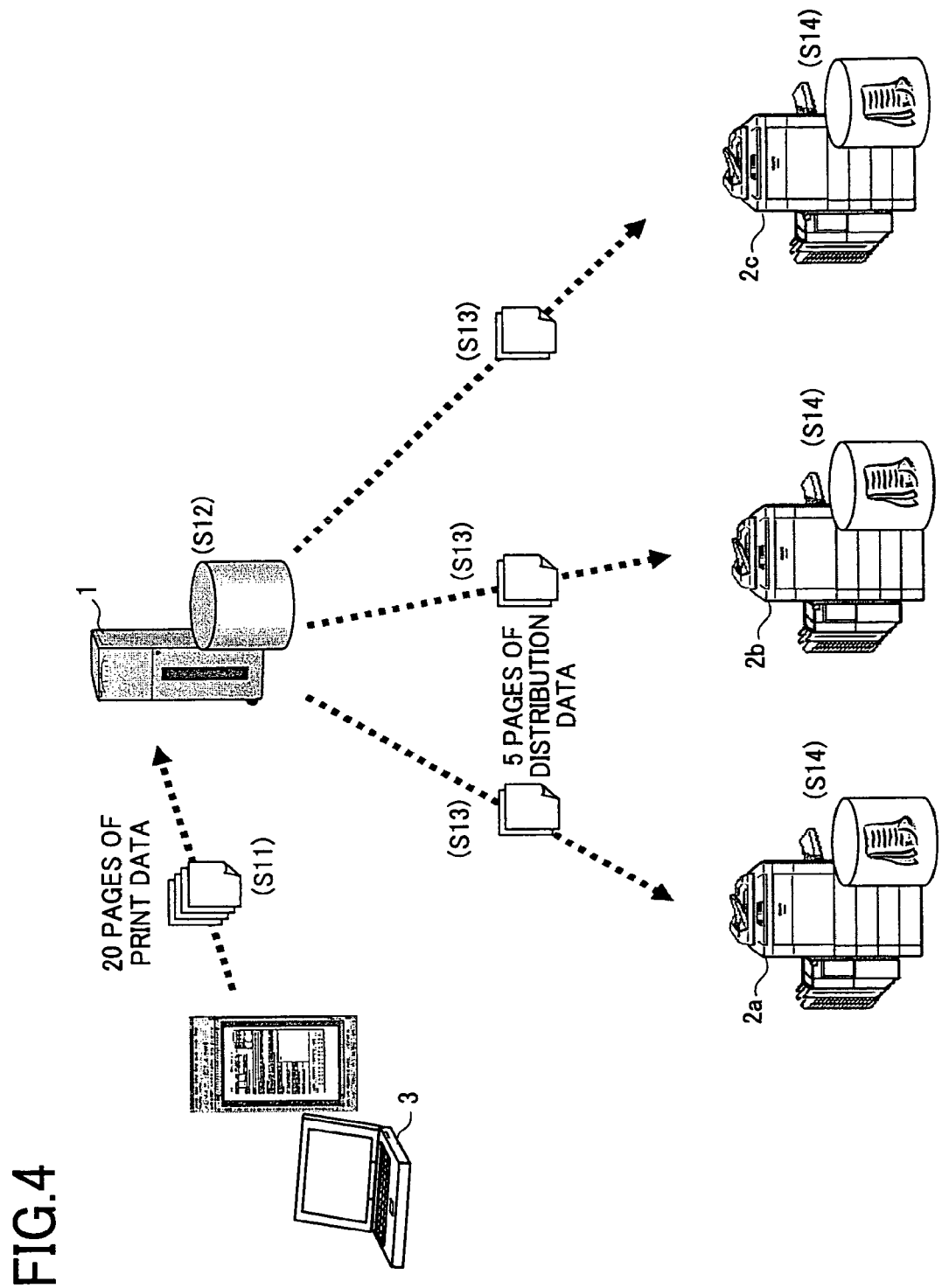
FIG. 4 is a diagram for explaining another example of the hold print processing flow according to the print control system of the present invention.

FIG. 4 is a diagram for explaining another example of the hold print processing flow according to the print control system of the present invention. Although basic processing flow is same as the example in FIG. 3, it is different in terms of that only a first plurality of pages of print data is transmitted to each of the printers. First, when a user performs a print operation from the PC 3, all of the print data is transmitted to the print server 1 (S11), and the print server 1 stores the print data from the PC 3 in the storage portion 12 (S12). The print data herein has 20 pages in total. The print server 1 transmits a first plurality of pages (herein, 5 pages) of the print data stored in the storage portion 12 simultaneously to each of the printers 2a, 2b and 2c (S13). Each of the printers 2a, 2b and 2c stores the print data (5 pages) received from the print server 1 in the storage portions (S14).

In this way, not all pages of the print data, but a start page, or several pages from the start page of the print data is previously held by the printers, and thereby it is possible to use the storage capacity more efficiently compared with a case when all of the print data is held by each of the printers.

When printing from an end page in a face-up print, several pages from the end page of the print data may be previously held by the printers.

In this way, when the first plurality of pages of the print data is transmitted to each of the printers, the plurality of pages are transmitted in a printing order from the print start page, regardless of the page number.

Figure 5:
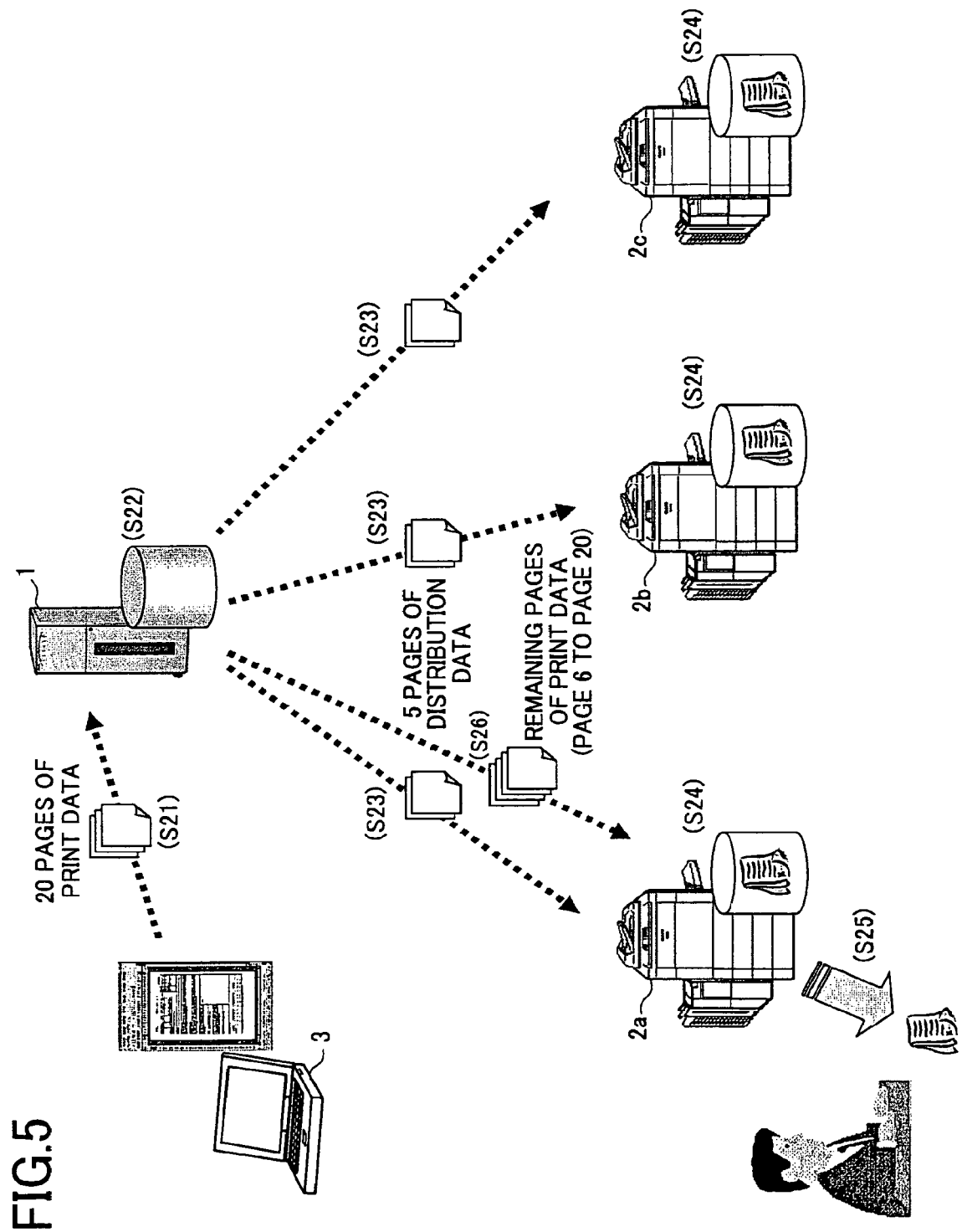
FIG. 5 is a diagram for explaining another example of the hold print processing flow according to the print control system of the present invention.

FIG. 5 is a diagram for explaining another example of the hold print processing flow according to the print control system of the present invention. Although basic processing flow is same as the example in FIG. 4, it is different in terms of that only a first plurality of pages of print data is transmitted to each of the printers, and thereafter when a printer print-instructed by a user performs a print output, the print server 1 transmits remaining pages of the print data to the printer. First, when a user performs a print operation from the PC 3, all of the print data is transmitted to the print server 1 (S21), and the print server 1 stores the print data from the PC 3 in the storage portion 12 (S22). The print data herein has 20 pages in total. The print server 1 transmits a first plurality of pages (herein, 5 pages) of the print data stored in the storage portion 12 simultaneously to each of the printers 2a, 2b and 2c (S23). Each of the printers 2a, 2b and 2c stores the print data (5 pages) received from the print server 1 in the storage portions (S24).

Then, in the case of the present example, the user inputs a password from the operation portion 23 of the printer 2a to print out necessary print data from the printer 2a (S25). When the user performs an output operation in the printer 2a, a print notification thereof is transmitted to the print server 1, and the print server 1 transmits remaining pages (herein, from page 6 to page 20) of the print data to the printer 2a (S26).

As shown in FIG. 5, in a case where the plurality of printers hold a part of the print data, when a print notification is received from any one of the plurality of printers, the print data transmission portion 114 of the print server 1 may transmit the remaining data of the print data to the printer.

Thereby, the printer to which the print instruction is made obtains the remaining print data, while performing a print output of a start page or several pages from the start page of the print data, thus making it possible to perform the print output efficiently.

Figure 6:
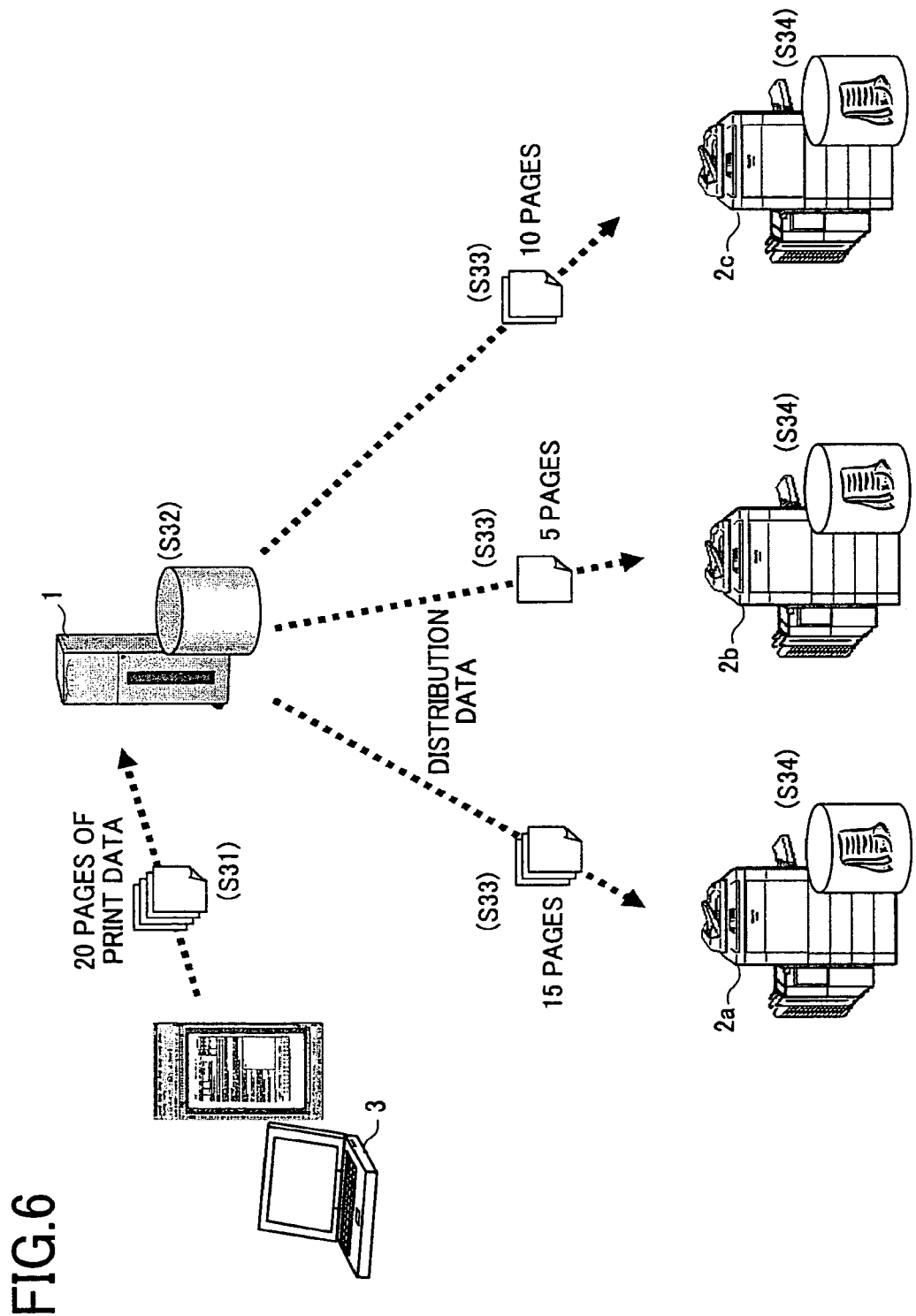
FIG. 6 is a diagram for explaining another example of the hold print processing flow according to the print control system of the present invention.

FIG. 6 is a diagram for explaining another example of the hold print processing flow according to the print control system of the present invention. Although basic processing flow is same as the example in FIG. 4, it is different in terms of that the transmission amount of print data varies depending on state information (such as a processing capability) in each of the printers. First, when a user performs a print operation from the PC 3, all of the print data is transmitted to the print server 1 (S31), and the print server 1 stores the print data from the PC 3 in the storage portion 12 (S32). Note that, the print data herein has 20 pages in total. The print server 1 simultaneously transmits different amounts of the print data among the print data stored in the storage portion 12, depending on state information in each of the printers 2a, 2b and 2c (S33). Herein, the printer 2a is a high-speed printer so that the largest amount of the print data, 15 pages, is transmitted thereto, the printer 2b is a low-speed printer so that the smallest amount of the print data, 5 pages, is transmitted thereto, and the printer 2c is a low-speed network printer so that a middle amount between the above two of the print data, 10 pages, is transmitted thereto. Then, each of the printers 2a, 2b and 2c stores each of the print data (herein, 15 pages, 5 pages, and 10 pages, respectively) received from the print server 1 in the storage portions (S34).

As shown in FIG. 6, the print data transmission portion 114 of the print server 1 may differentiate the transmission amount of the print data to the plurality of printers, respectively, depending on the state information stored in the storage portion 12.

In this way, a time required for the print output depends on such as processing capabilities of each of the printers, and therefore it is possible to adjust the amount of the print data depending on states of the printers so as to shorten the time for the print output.

Figure 7:
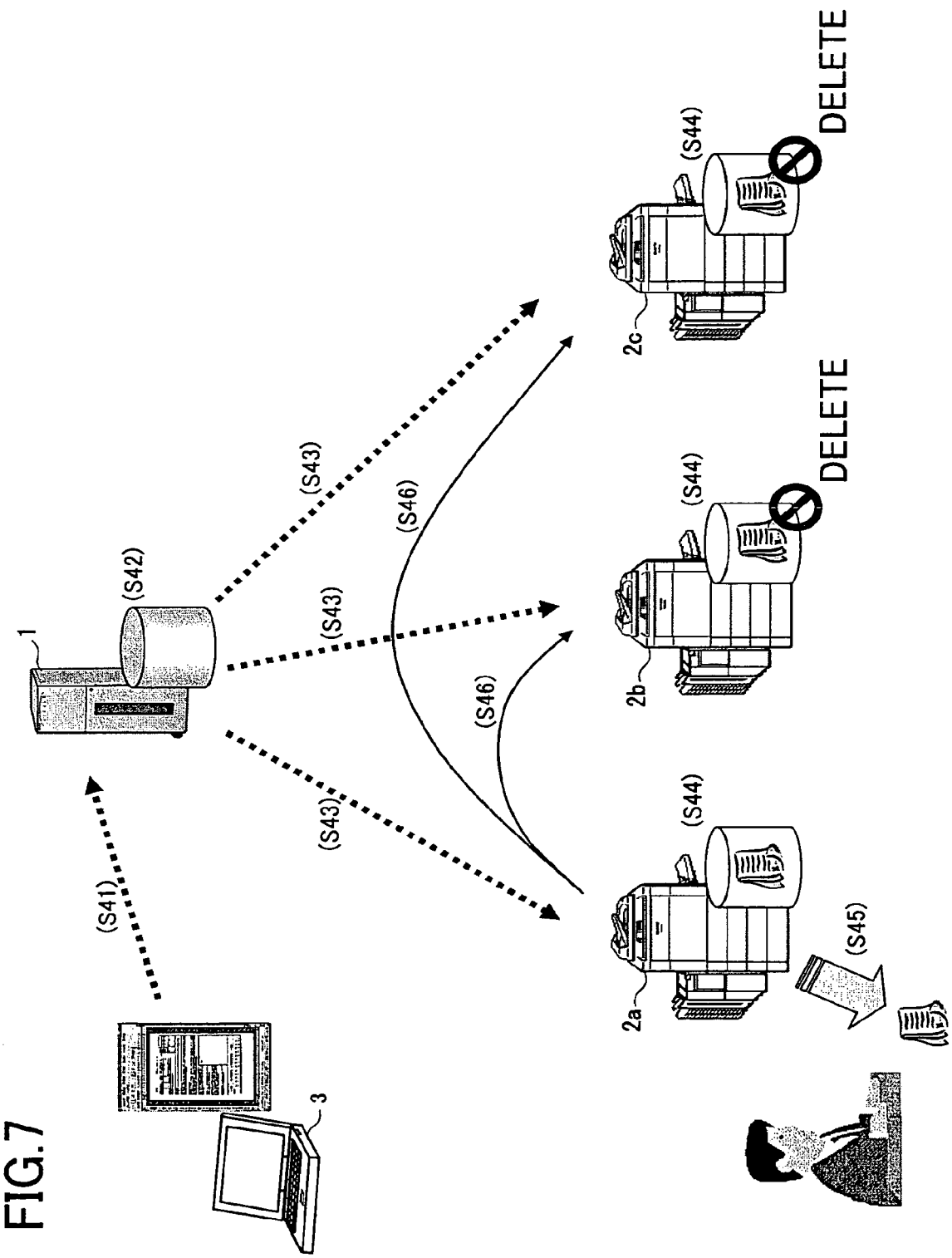
FIG. 7 is a diagram for explaining another example of the hold print processing flow according to the print control system of the present invention.

FIG. 7 is a diagram for explaining another example of the hold print processing flow according to the print control system of the present invention. Although basic processing flow is same as the example in FIG. 3, it is different in terms of that when a user performs an output operation in anyone of the printers, a print notification thereof is transmitted to the print server 1, and the print server 1 that has received the print notification instructs other printers to delete the print data.

The deletion processing of the print data for other printers may be performed between the printers without using the print server 1. For example, when a print instruction is made to the printer 2a by an operation of a user, a print notification thereof is transmitted to other printers 2b and 2c from the printer 2a. In response to the print notification, the printers 2b and 2c delete each of the print data. This is an example in the case of the printer 2a, which is also applicable when the print instruction is made for the printers 2b and 2c. The example of FIG. 7 illustrates a case that the deletion processing of the print data is performed between the printers without using the print server 1.

First, when a user performs a print operation from the PC 3, all of the print data is transmitted to the print server 1 (S41), and the print server 1 stores the print data from the PC 3 in the storage portion 12 (S42). The print server 1 transmits the print data stored in the storage portion 12 simultaneously to each of the printers 2a, 2b and 2c (S43). Each of the printers 2a, 2b and 2c stores the print data received from the print server 1 in the storage portions (S44).

Then, in the case of the present example, the user inputs a password from the operation portion 23 of the printer 2a to print out necessary print data from the printer 2a (S45). A print notification is transmitted from the printer 2a that has performed the print output to other printers 2b and 2c (S46), and the printers 2b and 2c that have received the print notification delete each of the print data from the storage portions.

In this way, a plurality of printers on the network are caused to hold the print data beforehand, and therefore it is possible to perform a print output of desired print data no matter to which printers a user makes a print instruction. In addition, the other print data in the printers other than the printer print-instructed by the user is automatically deleted, thus making it possible to use the storage capacity efficiently while attaining the protection of such as confidential documents.

Figure 8:
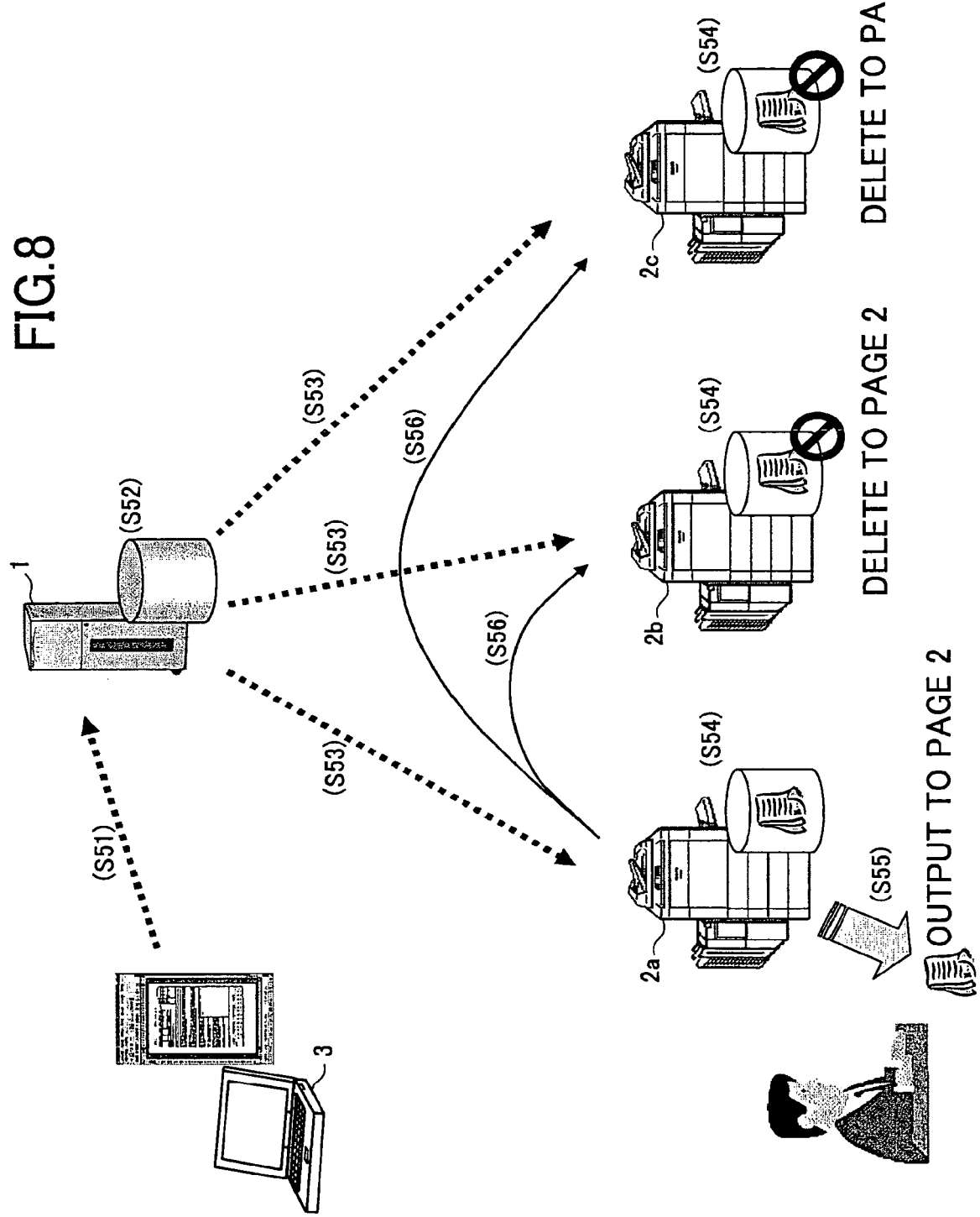
FIG. 8 is a diagram for explaining another example of the hold print processing flow according to the print control system of the present invention.

FIG. 8 is a diagram for explaining another example of the hold print processing flow according to the print control system of the present invention. Although basic processing flow is same as the example in FIG. 7, it is different in terms of that when a user performs an output operation in anyone of the printers, a print notification thereof and information of the amount of the print data that the printing is completed in the printer are transmitted together to the print server 1, and the print server 1 that has received the information of the amount of the print data instructs other printers to delete pages that the printing is completed. Similar to the example of FIG. 7, the deletion processing of the print data with respect to other printers may be performed between the printers directly without using the print server 1. The example of FIG. 8 illustrates a case that the deletion processing of the print data is performed without using the print server 1.

First, when a user performs a print operation from the PC 3, all of the print data is transmitted to the print server 1 (S51), and the print server 1 stores the print data from the PC 3 in the storage portion 12 (S52). The print server 1 transmits the print data stored in the storage portion 12 simultaneously to each of the printers 2a, 2b and 2c (S53). Each of the printers 2a, 2b and 2c stores the print data received from the print server 1 in the storage portions (S54).

Then, in the case of the present example, the user inputs a password from the operation portion 23 of the printer 2a to print out necessary print data (herein, to page 2) from the printer 2a (S55). A print notification is transmitted from the printer 2a that has performed the print output to other printers 2b and 2c (S56). The print notification includes information of the amount of the print data that the printing is completed by the printer 2a (herein, output to page 2). When the printers 2b and 2c receive the print notification including the information of the amount of the print data that the printing is completed, the printers 2b and 2c delete each of the print data to page 2 from the storage portions, based on the print notification.

Further, as another example, when the print data deletion instruction portion 115 of the print server 1 receives a print notification from any one of the plurality of printers, the deletion of the amount of the print data that the printing is completed by the above printer may be instructed to the other printers other than the above printer, based on information of the amount of the print data that the printing is completed, included in the print notification.

In this way, the print data that has been simultaneously transmitted is instructed to delete for every unnecessary page without deleting all pages, and thereby it is possible to shorten a time to hold the print data in other printers.

Figure 9:
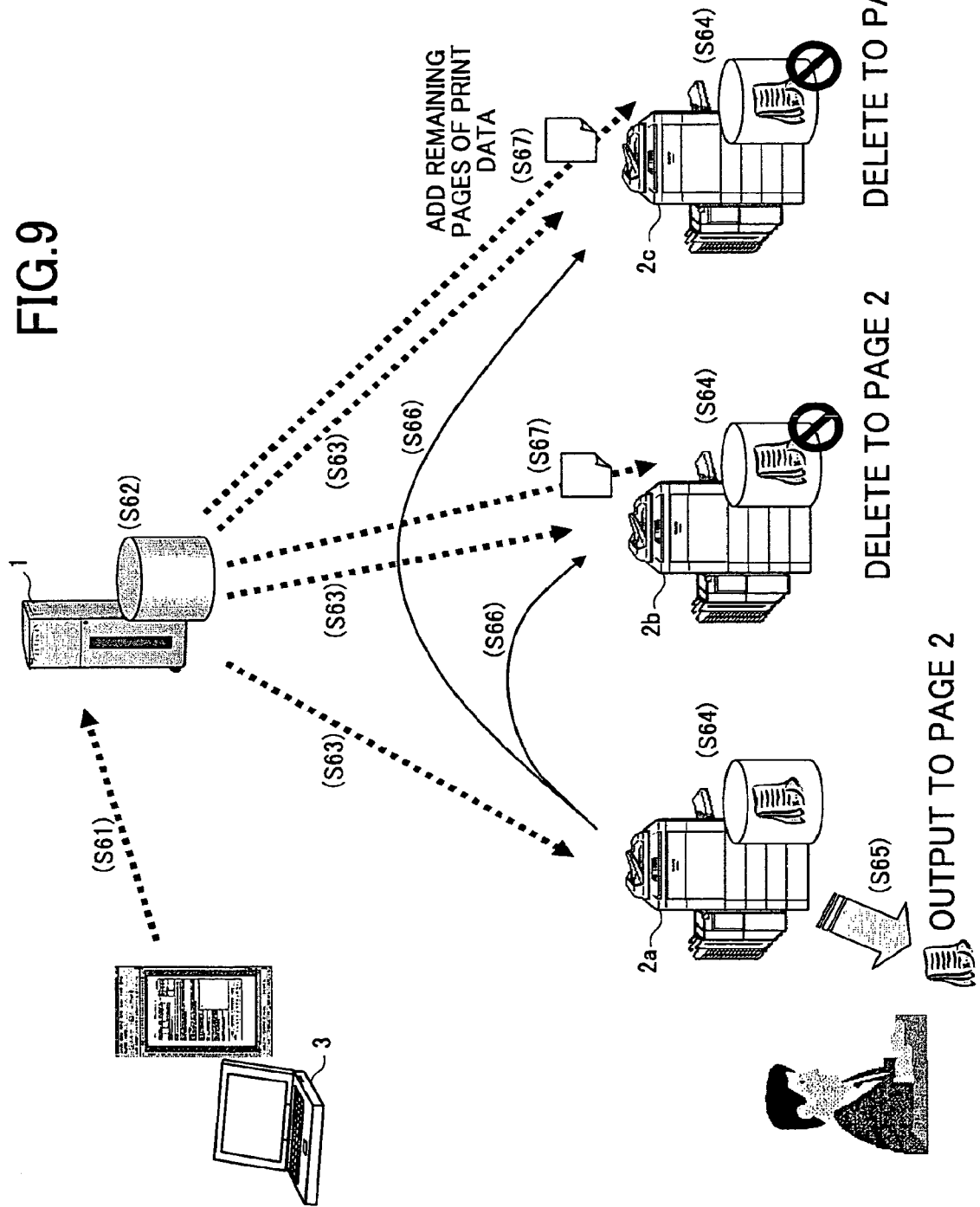
FIG. 9 is a diagram for explaining another example of the hold print processing flow according to the print control system of the present invention.

FIG. 9 is a diagram for explaining another example of the hold print processing flow according to the print control system of the present invention. Although basic processing flow is same as the example in FIG. 8, it is different in terms of that when a first plurality of pages of print data is transmitted and thereafter a user performs an output operation in any one of the printers, then a print notification thereof and information of the amount of the print data that the printing is completed by the printer are transmitted together to the print server 1, and the print server 1 that has received the print notification instructs other printers to delete pages that the printing is completed, and subsequently the print server 1 transmits the remaining pages of the print data to other printers. Similar to the example of FIG. 8, the deletion processing of the print data with respect to other printers may be performed directly between the printers without using the print server 1. The example of FIG. 9 illustrates a case that the deletion processing of the print data is performed without using the print server 1.

First, when a user performs a print operation from the PC 3, all of the print data is transmitted to the print server 1 (S61), and the print server 1 stores the print data from the PC 3 in the storage portion 12 (S62). The print data herein has 20 pages in total. The print server 1 transmits a first plurality of pages (herein, 5 pages) of the print data stored in the storage portion 12 simultaneously to each of the printers 2a, 2b and 2c (S63). Each of the printers 2a, 2b and 2c stores the print data (herein, 5 pages) received from the print server 1 in the storage portions (S64).

Then, in the case of the present example, the user inputs a password from the operation portion 23 of the printer 2a to print out necessary print data (herein, to page 2) from the printer 2a (S65). A print notification is transmitted from the printer 2a that has performed the print output to other printers 2b and 2c (S66). The print notification includes information of the amount of the print data that the printing is completed by the printer 2a (herein, output to page 2). When the printers 2b and 2c receive the print notification including the information of the amount of the print data that the printing is completed, the printers 2b and 2c delete each of the print data to page 2 from the storage portions, based on the print notification.

Further, the print notification from the printer 2a is transmitted to the print server 1, and the print server 1 transmits the remaining pages of the print date (herein, from page 6 to page 20) to the printers 2b and 2c (S67). In the present example, only 2 of 5 pages are output from the printer 2a. In this case, it is considered that some error occurs in the printer 2a, and the user is likely to cause other printers 2b and 2c to output the remaining pages. Therefore, the print server 1 is configured so as to transmit the remaining pages to other printers 2b and 2c.

Further, as another example, in a case where a plurality of printers hold a part of print data, when the print data transmission portion 114 of the print server 1 receives a print notification from any one of the plurality of printers, the remaining data of the print data is transmitted to the other printers other than the printer. Then, the print data deletion instruction portion 115 may instruct other printers to delete the amount of the print data that the printing is completed by the above printer, based on the information of the amount of the print data that the printing is completed, included in the print notification.

Figure 10:
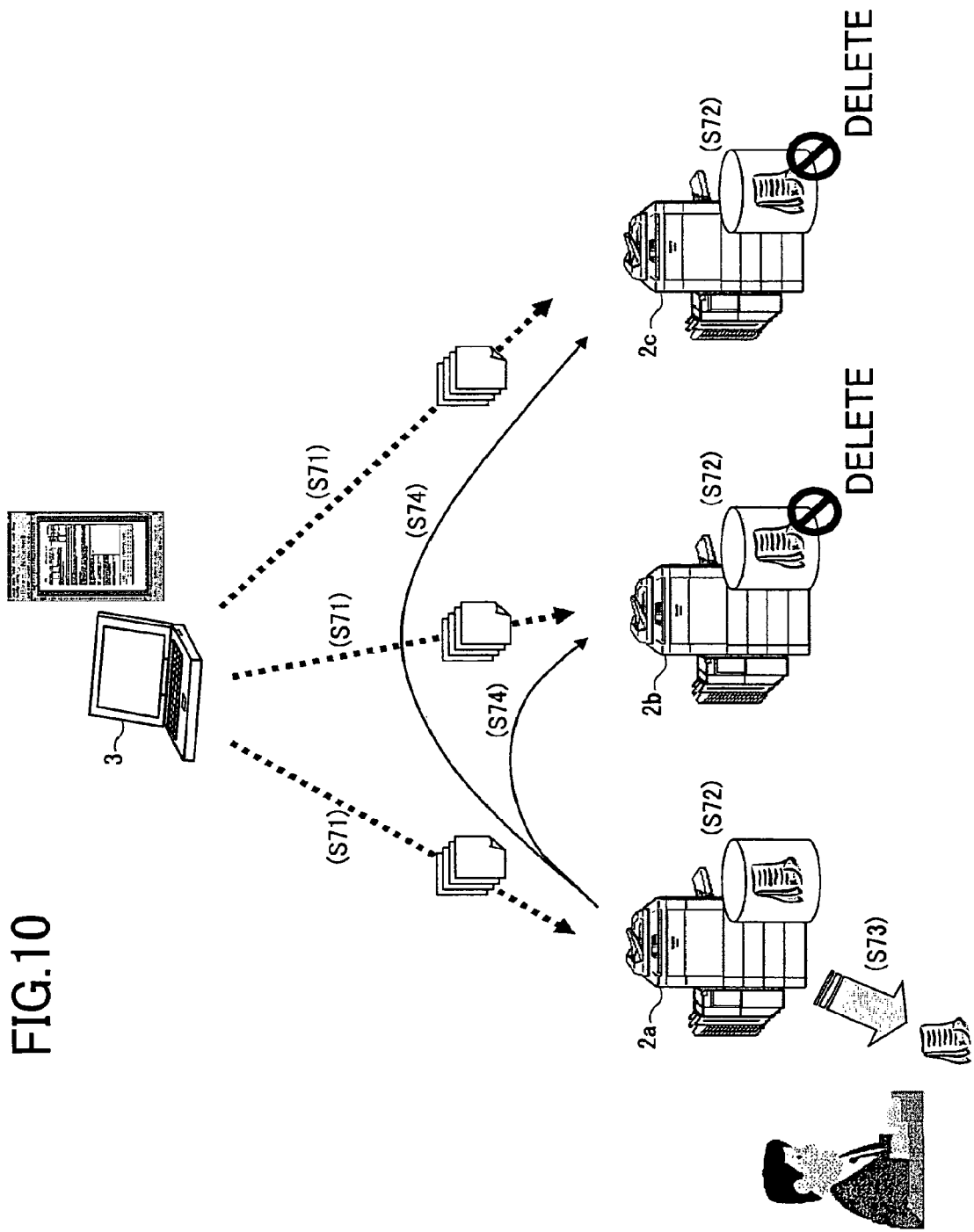
FIG. 10 is a diagram for explaining another example of the hold print processing flow according to the print control system of the present invention.

FIG. 10 is a diagram for explaining another example of the hold print processing flow according to the print control system of the present invention. The present example illustrates a system in which the PC 3 performs a series of transmission processing by the print control apparatus 1 in FIG. 7 described above.

First, when a user performs a print operation from the PC 3, the print data is transmitted to each of the printers 2a, 2b and 2c simultaneously (S71). Each of the printers 2a, 2b and 2c stores the print data received from the PC 3 in the storage portions (S72).

Then, in the case of the present example, the user inputs a password from the operation portion 23 of the printer 2a to print out necessary print data from the printer 2a (S73). A print notification is transmitted from the printer 2a that has performed the print output to other printers 2b and 2c (S74), and the printers 2b and 2c that have received the print notification delete each of the print data from the storage portions.

Figure 11:
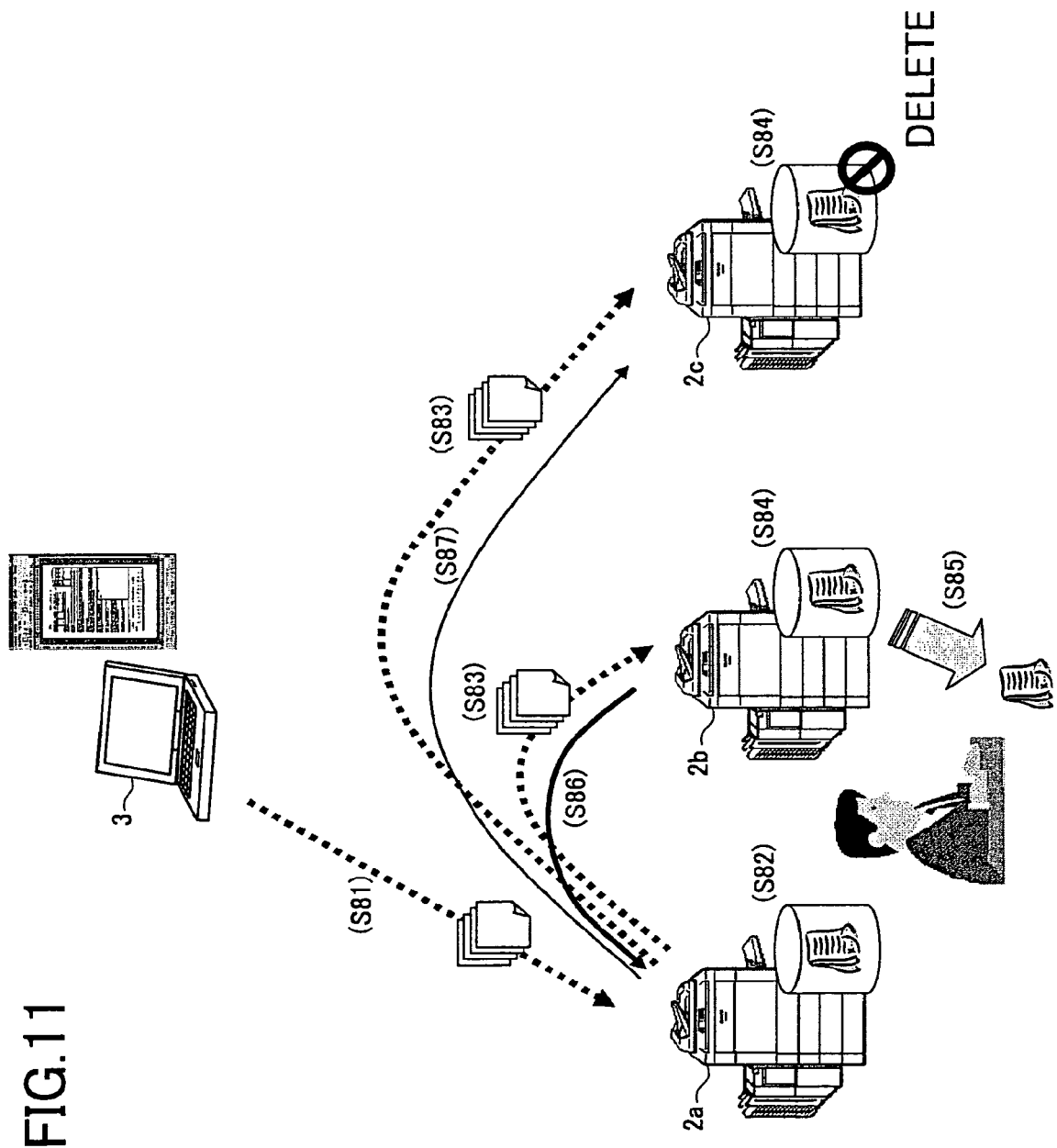
FIG. 11 is a diagram for explaining another example of the hold print processing flow according to the print control system of the present invention.

FIG. 11 is a diagram for explaining another example of the hold print processing flow according to the print control system of the present invention. The present example illustrates a system in which the printer 2a performs a series of transmission processing by the print control apparatus 1 in FIG. 7 described above. In other words, the printer 2a includes the transmission destination printer extraction portion 112, the transmission page allocation portion 113, the print data transmission portion 114, and the print data deletion instruction portion 115, that are included in the print server 1, and can execute functions of the print server 1.

First, when a user performs a print operation from the PC 3, the print data is transmitted to the printer 2a (S81). The printer 2a stores the print data received from the PC 3 in the storage portion 24 (S82). The printer 2a transmits the print data stored in the storage portion 24 simultaneously to each of the printers 2b and 2c (S83). Each of the printers 2b and 2c stores the print data received from the printer 2a in the storage portions (S84).

Then, in the case of the present example, the user inputs a password from the operation portion 23 of the printer 2b to print out necessary print data from the printer 2b (S85). A print notification is transmitted from the printer 2b that has performed the print output to the printer 2a (S86), and the printer 2a that has received the print notification instructs the printer 2c to delete the print data from the storage portion (S87). The printer 2c that has received the deletion instruction deletes the print data in the storage portion.

Figure 12:
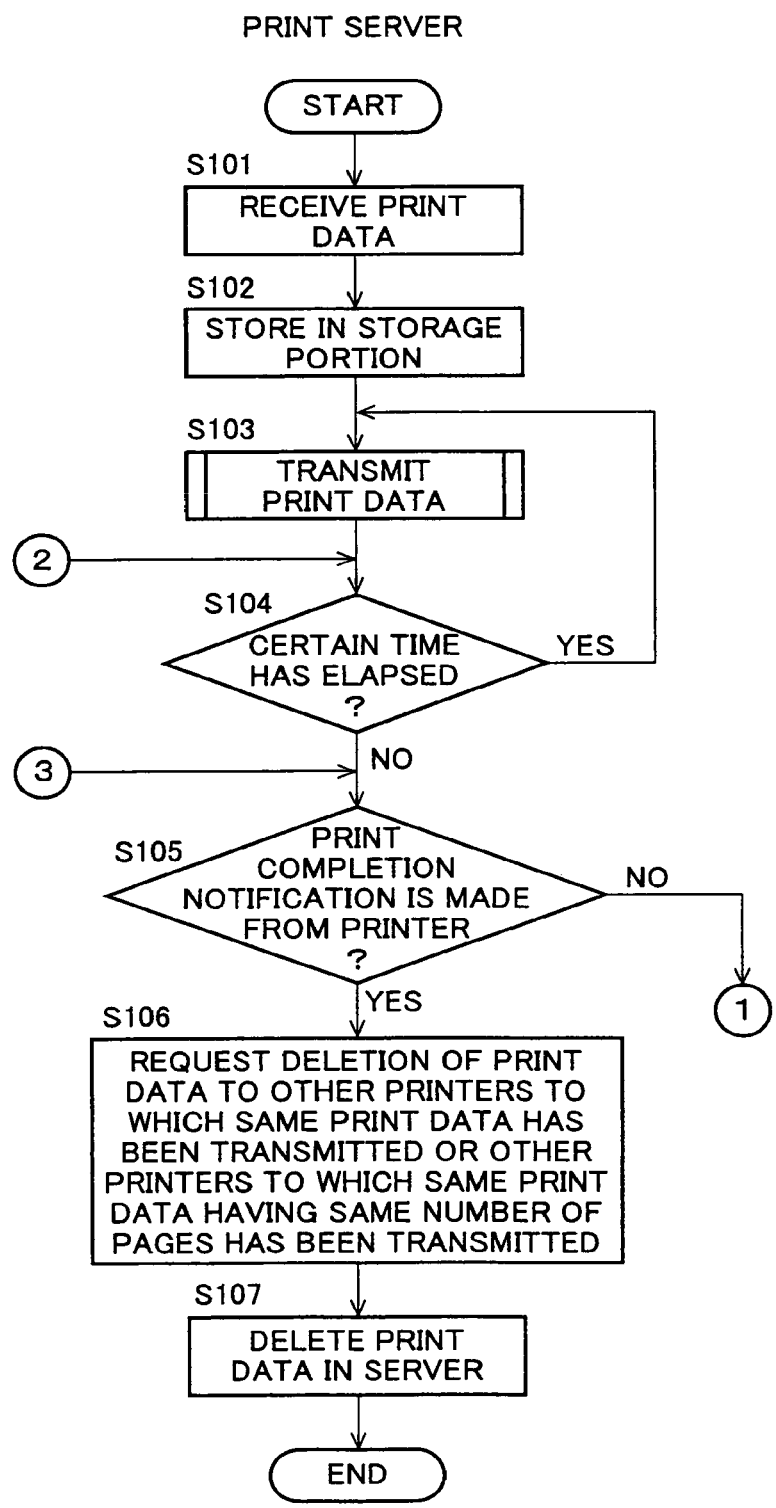
FIG. 12 is a flowchart for explaining an example of a print control method by a print server according to the present invention.

FIG. 12 is a flowchart for explaining an example of a print control method by the print server 1 according to the present invention. The description is made based on the system configuration shown in FIG. 1 in the present example. First, the print server 1 receives print data from the PC 3 (step S101), and then stores the print data in the storage portion 12 (step S102).

Subsequently, the print server 1 transmits the print data stored in the storage portion 12 to each of the printers 2a, 2b and 2c (step S103). It is determined that whether a certain time has elapsed from the transmission of the print data (step S104), and when the certain time has elapsed (in the case of YES), going back to step S103 to repeat from the transmission processing of the print data. Alternatively, at step S104, when the certain time has not elapsed (in the case of NO), it is determined that whether a print completion notification is made from any one of the printers 2a, 2b and 2c (step S105).

At step S105, when no print completion notification is made from any of the printers (in the case of NO), the print server 1 moves to step S141 shown in FIG. 16 described below. Whether or not the print completion notification is made is determined, for example, by the method of determining the presence of a flag indicative of the print completion notification. The print completion notification may be made not only in the job units, but for every page, or for every predetermined page. Alternatively, at step S105, when the print completion notification is made, for example, from the printer 2a (in the case of YES), other printers 2b and 2c to which the same print data has been transmitted, or other printers 2b and 2c to which the same print data having same number of pages has been transmitted, are requested to delete the print data (step S106), and the corresponding print data in the print server 1 is deleted (step S107).

Figure 13:
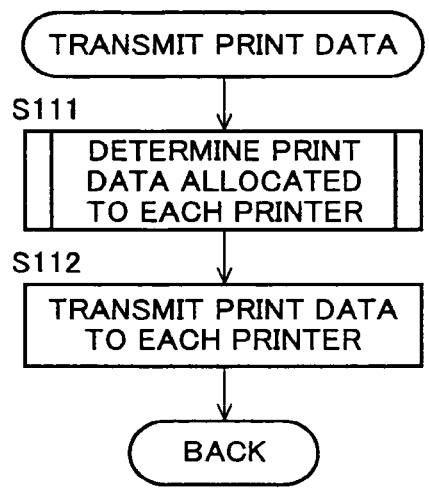
FIG. 13 is a flowchart for explaining an example of a print data transmission processing of step S103 shown in FIG. 12.

FIG. 13 is a flowchart for explaining an example of the print data transmission processing of step S103 shown in FIG. 12. First, the print server 1 determines the print data to be allocated to each of the printers (step S111), and transmits the print data to each of the printers (step S112).

Figure 14:
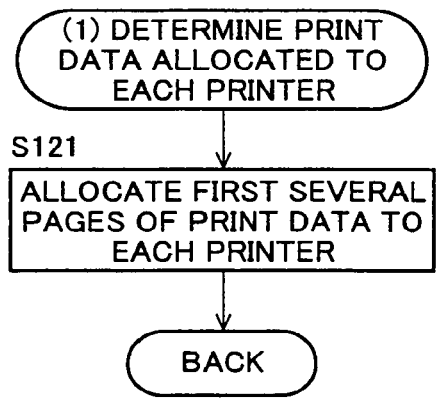
FIG. 14 is a flowchart for explaining an example of a print data allocation processing of step S111 shown in FIG. 13.

FIG. 14 is a flowchart for explaining an example of the print data allocation processing of step S111 shown in FIG. 13. First, the print server 1 allocates a first several pages of the print data to each of the printers, by referring to the management table shown in FIG. 2A (step S121).

Figure 15:
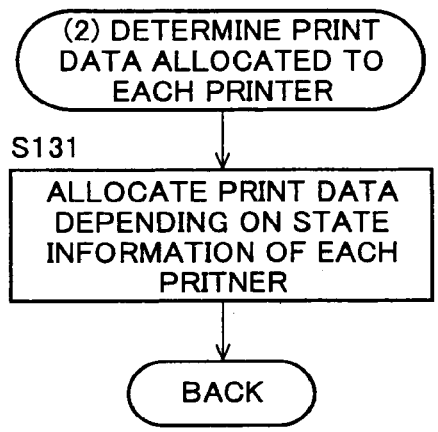
FIG. 15 is a flowchart for explaining another example of the print data allocation processing of step S111 shown in FIG. 13.

FIG. 15 is a flowchart for explaining another example of the print data allocation processing of step S111 shown in FIG. 13. First, the print server 1 allocates the print data depending on state information (such as a processing capability, a job state, and communication state) of each of the printers, by referring to the management table shown in FIG. 2B (step S131).

Figure 16:
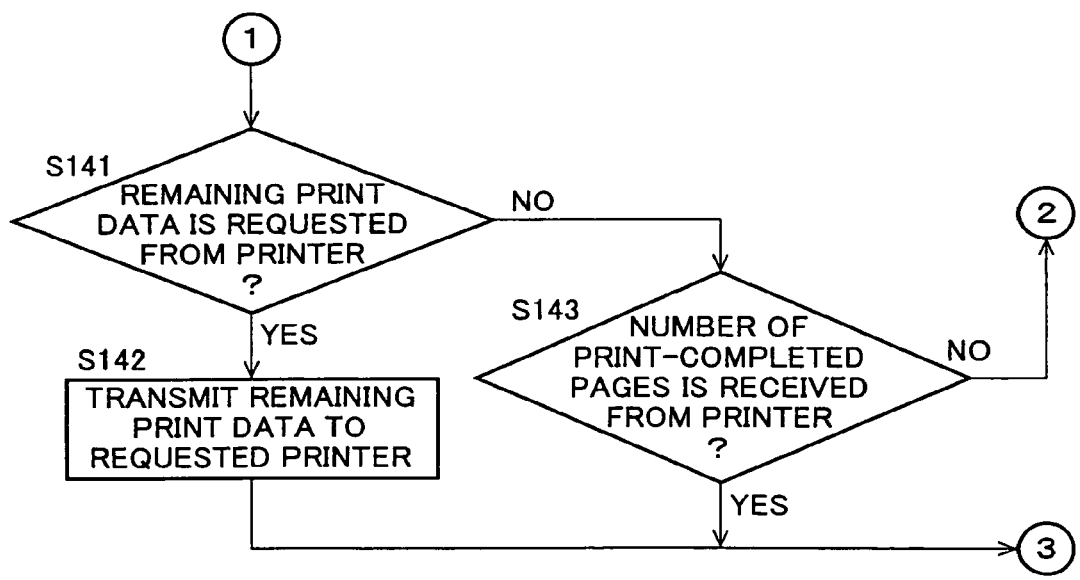
FIG. 16 is a flowchart for explaining a processing when no print notification is made at step S105 shown in FIG. 12.

FIG. 16 is a flowchart for explaining a processing when no print completion notification is made at step S105 shown in FIG. 12. First, at step S105 described above, no print completion notification is made from any one (for example, the printer 2a) of the printers 2a, 2b and 2c (in the case of NO), the print server 1 determines whether a request for remaining print data is made from the printer 2a (step S141).

When the request for the remaining print data is made from the printer 2a at step S141 (in the case of YES), the print server 1 transmits the remaining print data to the printer 2a that has made the request (step S142), followed by going back to step S105 in FIG. 12 to repeat the processing. Alternatively, when no request for the remaining print data is made from the printer 2a at step S141 (in the case of NO), it is determined whether the number of pages that the printing is completed is received from the printer 2a (step S143).

When the number of pages that the printing is completed is received from the printer 2a at step S143 (in the case of YES), the print server 1 goes back to step S105 in FIG. 12 to repeat the processing. Alternatively, when the number of pages that the printing is completed is not received from the printer 2a at step S143 (in the case of NO), going back to step S104 in FIG. 12 to repeat the processing.

Figure 17:
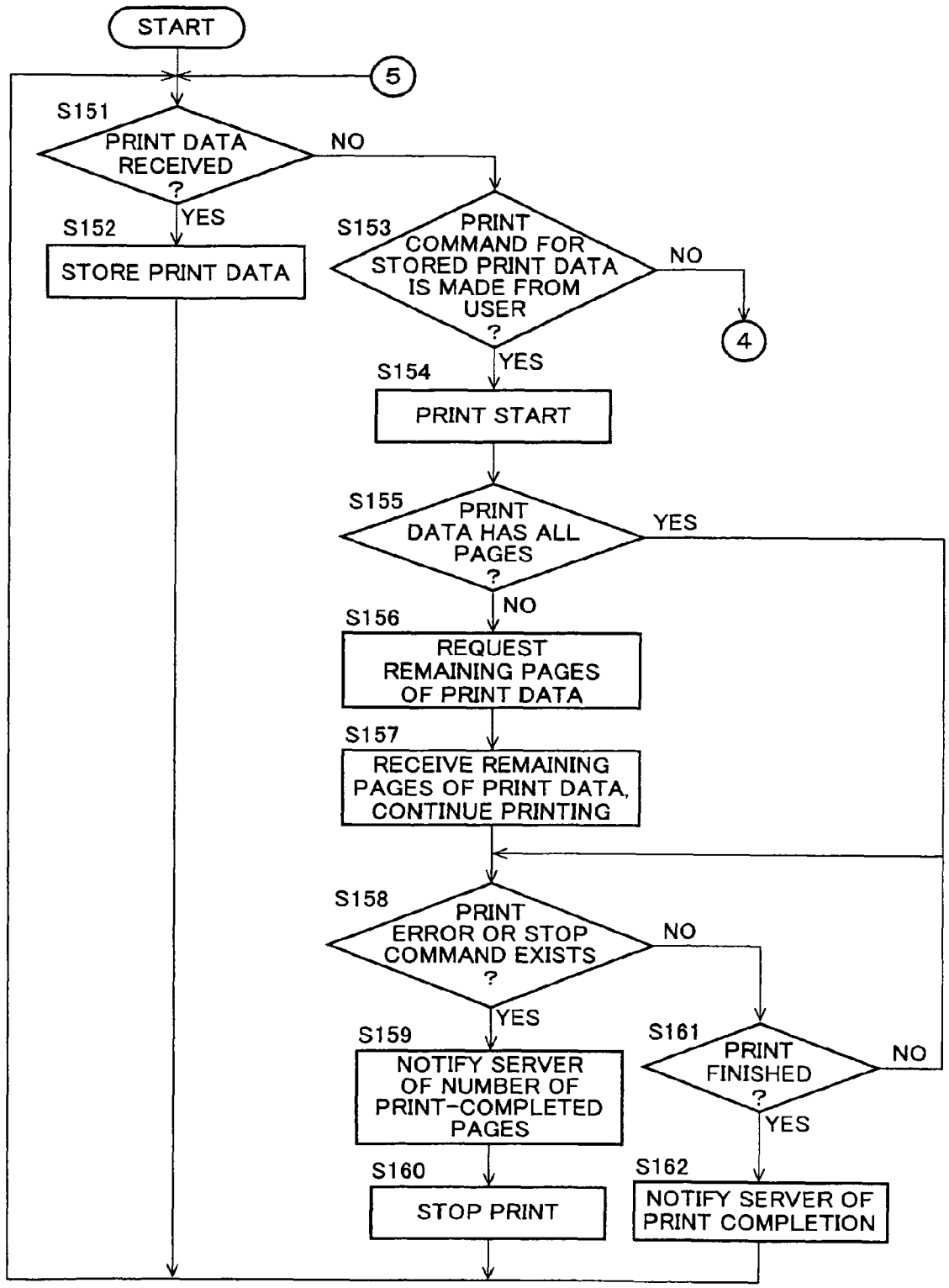
FIG. 17 is a flowchart for explaining an operation example of a printer according to the present invention.

FIG. 17 is a flowchart for explaining an operation example of the printer 2a according to the present invention. The description is made based on the system configuration shown in FIG. 1 in the present example. First, the printer 2a determines whether print data is received from the print server 1 (step S151), and when the print data is received (in the case of YES), the print data is stored in the storage portion (step S152), followed by going back to step S151 to repeat the processing. Alternatively, when the print data is not received at step S151 (in the case of NO), it is determined whether a print command for the stored print data is made from a user (step S153). In other words, it is determined whether a password etc., is input by the user in order to perform a hold print.

When it is determined that no print instruction is made from the user at step S153 (in the case of NO), the printer 2a moves to step S171 in FIG. 18 described below. Alternatively, when it is determined that the print instruction is made from the user at step S153 (in the case of YES), the print data is started to be printed step S154), and it is determined whether the print data has all the pages (step S155).

When it is determined that the print data does not have all the pages at step S155 (in the case of NO), the printer 2a requests the remaining pages of the print data to the print server 1 (step S156), followed by receiving the remaining pages of the print data from the print server 1 and continuing the print processing (step S157). Alternatively, when it is determined that the print data has all the pages at step S155 (in the case of YES), moving to step S158.

In the processing of step S157, a flag indicative of the print completion may be transmitted to the print server 1 as the print completion notification when the printing is completed for each page, or for predetermined page.

Subsequently, the printer 2a determines whether there is a print error or a print stop command (step S158), and when there is a print error or a print stop command (in the case of YES), the printer 2a notifies the number of pages that the printing is completed to the print server 1 (step S159) and stops the printing (step S160), followed by going back to step S151 to repeat the processing. Alternatively, when there is no print error or print stop command at step S158 (in the case of NO), it is determined whether the printing is completed (step S161).

When it is determined that the printing is completed at step S161 (in the case of YES), the printer 2a transmits the print completion notification to the print server (step S162), followed by going back to step S151 to repeat the processing. Alternatively, it is determined that the printing is not completed at step S161 (in the case of NO), going back to step S158 to repeat the processing.

Figure 18:
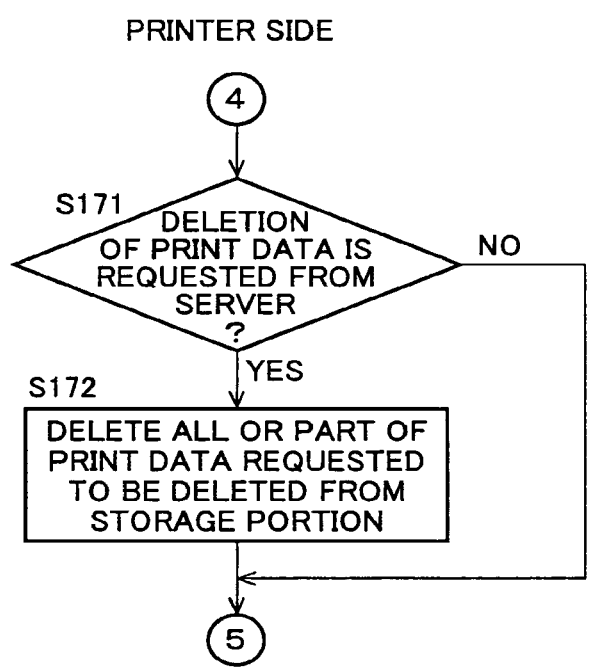
FIG. 18 is a flowchart for explaining a processing when no print command is made by a user at step S153 shown in FIG. 17.

FIG. 18 is a flowchart for explaining the processing when no print command is made by a user at step S153 shown in FIG. 17. First, the printer 2a determines whether the deletion request of the print data is made from the print server 1 (step S171), and when the deletion is requested (in the case of YES), all of, or part of the print data requested to delete is deleted from the storage portion (step S172), followed by going back to step S151 in FIG. 17 to repeat the processing. Alternatively, when no deletion request is made at step S171 (in the case of NO), going back to step S151 in FIG. 17 to repeat the processing.

In order to execute the flows illustrated in FIGS. 17 and 18, the printer 2a includes the storage portion 24 that stores print data transmitted from the print server 1; the operation portion 23 (corresponding to the print instruction portion of the present invention) that performs a print instruction for the print data stored in the storage portion 24; the image forming portion 21 (corresponding to a print portion of the present invention) that executes the print processing of the print data in response to the print instruction from the operation portion 23; and the print notification portion 222 that, when the print processing by the image forming portion 21 is interrupted, notifies information of the amount of the print data that the printing is completed before the print interruption.

In this way, even if the printing is interrupted, the printer notifies the print server of the amount of the data that the printing is completed, the print server can request other printers delete the amount of the data that the printing is completed. Then, it is possible that a user moves to other printers and prints the remaining print data that the printing is interrupted from other printers.

Further, even if the printing is interrupted by a print stop instruction by a user, or an error during printing, similarly, it is possible that the user moves to other printers and prints the remaining print data that the printing is interrupted from other printers.

As described above, in the present invention, a plurality of print apparatuses on a network is caused to hold print data in advance, and therefore desired print data can be printed out no matter to which print apparatus a user makes a print instruction. Further, print data in other print apparatuses other than the print apparatus print-instructed by a user is automatically deleted, thus making it possible to use the storage capacity of the print apparatus efficiently while attaining the protection of such as confidential documents.

Now referring to FIGS. 19 to 40, other preferred embodiments of the print control apparatus, the print control system and the print apparatus of the present invention will be described.

Figure 19:
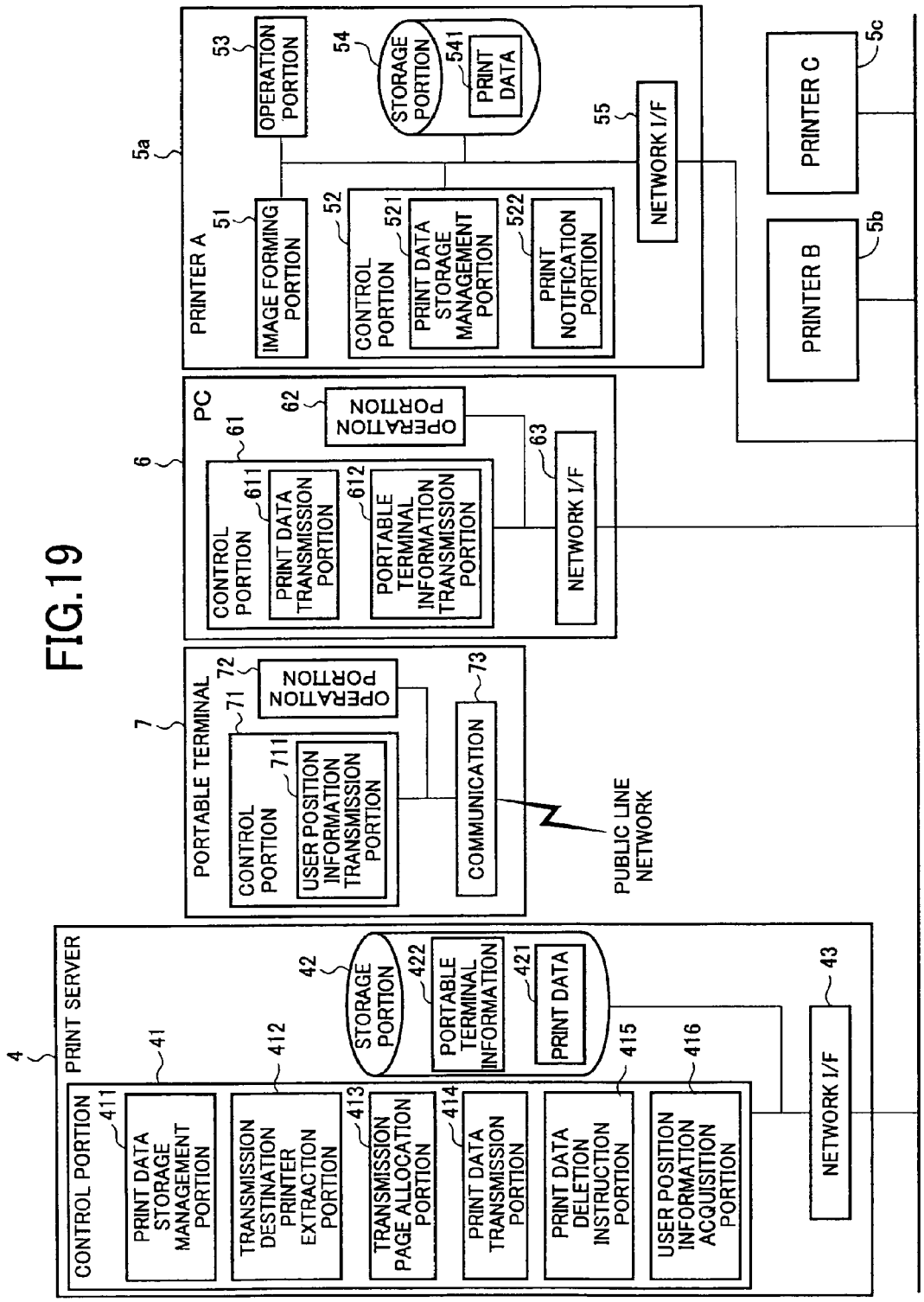
FIG. 19 is a block diagram showing an exemplary configuration of the print control system provided with the print control apparatus of the present invention.

FIG. 19 is a block diagram showing a exemplary configuration of the print control system provided with the print control apparatus of the present invention. 4 denotes a print server that corresponds to the print control apparatus of the present invention, 5a to 5c denote printers that correspond to the print apparatus of the present invention, 6 denotes a PC that corresponds to the user terminal of the present invention, and 7 denotes a portable terminal (hereinafter, referred as a portable terminal) with a GPS (Global Positioning System) function. The print server 4, the printers 5a to 5c, and the PC 6 are connected through a network, and any of the printers 5a to 5c have a hold print function. The print server 4 and the portable terminal 7 are connected through a public line network.

The print server 4 includes a control portion 41 that is constituted by such as a CPU, a ROM, and a RAM, and that controls operations of devices; a storage portion 42 that is constituted by such as a hard disc and a nonvolatile memory; and a network I/F 43 that is connected to the printers 5a to 5c and the PC 6 through a network. In addition, the control portion 41 is constituted by a print data storage management portion 411 that stores and manages print data 421 transmitted from the PC 6 in the storage portion 42; a transmission destination printer extraction portion 412 corresponding to a print apparatus extraction portion that extracts printers to be a transmission destination of the print data 421; a transmission page allocation portion 413 that performs an allocation of pages to transmit to each of the printers; a print data transmission portion 414 that transmits the print data 421 to each of the printers; a print data deletion instruction portion 415 that transmits a deletion command of print data to other printers if a print notification is made from a printer print-instructed by a user; and a user position information acquisition portion 416 that acquires position information of a user.

Each of the portions included in the control portion 41, i.e., the print data storage management portion 411, the transmission destination printer extraction portion 412, the transmission page allocation portion 413, the print data transmission portion 414, the print data deletion instruction portion 415, and the user position information acquisition portion 416 are constituted as an executable print control program by the print server 4. The print control program is stored in the storage portion 42 etc., and read by the control portion 41 in executing the program to be executed appropriately.

Further, the PC 6 includes a control portion 61 that is constituted by such as a CPU, a ROM, and a RAM, and that controls operations of devices; an operation portion 62 that performs such as an operation of transmitting print data; and a network I/F 63 that is connected to the printers 5a to 5c and the print server 4 through a network. Further, the control portion 61 includes a print data transmission portion 611 serving as a printer driver, and a portable terminal information transmission portion 612 that transmits portable terminal information of the portable terminal 7. The print data transmission portion 611 transmits print data to the print server 4 depending on an operation instruction from the operation portion 62. The portable terminal information transmitted by the portable terminal information transmission portion 612 includes information (such as an electronic mail address) to access through a network to the portable terminal 7 owned by a user who has transmitted the print data.

The portable terminal 7 with a GPS function includes a control portion 71 that is constituted by such as a CPU, a ROM, and a RAM, and that controls operations of devices; an operation portion 72 that performs various kinds of operations; and a communication I/F 73 that is connected to the print server 4 through a public line network. Further, the control portion 71 includes a user position information transmission portion 711, and transmits position information obtained by a GPS function to the print server 4. The user position information may be transmitted in response to a request (inquiry) from the print server 4, or may be transmitted periodically or at an arbitrary timing from the portable terminal 7.

In FIG. 19, when the print server 4 receives the print data 421 transmitted from the control portion 61 of the PC 6 on the network, the print data storage management portion 411 stores the print data 421 in the storage portion 42. In addition, portable terminal information 422 transmitted from the control portion 61 of the PC 6 is stored in the storage portion 42. When the print data 421 and the portable terminal information 422 are stored in the storage portion 42, the transmission destination printer extraction portion 412 of the print server 4 extracts printers to be a transmission destination of the print data 421, based on user position information obtained by the user position information acquisition portion 416.

The user position information acquisition portion 416 identifies the portable terminal 7 used by a user who has transmitted the print data from the PC 6, based on the portable terminal information 422 in the storage portion 42, so as to obtain user position information (for example, latitude/longitude etc.) from the portable terminal 7. When the user position information is obtained by the user position information acquisition portion 416, the user position information is stored in the storage portion 42 as a history. Not only the portable terminal of the present example, but information recording mediums such as an IC card, and a RFID may be used to acquire the user position information.

Subsequently, the transmission destination printer extraction portion 412 extracts two or more printers near a user position. User position information of each of the printers is previously stored in the storage portion 42, and printers near the user are extracted by comparing with the user position obtained by the user position information acquisition portion 416.

The transmission page allocation portion 413 allocates the number of pages of the print data to be transmitted to each of the printers extracted by the transmission destination printer extraction portion 412. For example, in the case of a high-speed printer, a print processing time after a print instruction to the high-speed printer was made, may be shortened by increasing the number of pages of the print data.

The print data transmission portion 414 transmits the allocated page number of the print data by the transmission page allocation portion 413 to each of the printers. The print data transmission portion 414 causes each of the printers to hold the print data when an instruction of a hold print is made from the PC 6. Herein, the print data transmission portion 414 may transmit by developing the print data into a common bitmap format to each of the printers to be a transmission destination of the print data, or may previously store information of a printer language (PDL: Page Description Language) corresponding to each of the printers and convert the print data depending on printer languages of each of the printers to transmit. In the former case, the print data is subject to a broadcast transmission in which no printer is specified, and in the latter case, the print data is subject to a multicast transmission in which each of the printers is specified.

When a print notification (print completion notification or print start notification) of the print data is received from the printer print-instructed by a user among printers to which the print data is transmitted by the print data transmission portion 414, the print data deletion instruction portion 415 instructs the other printers on the network other than the printer to delete the print data. Thereby, the print data stored in other printers is automatically deleted.

Although exemplary configuration of the printers 5a to 5c connected to the print server 4 will be described below, the printer 5a will be shown as a representative example because the basic configuration are same.

The printer 5a includes an image forming portion 51 that performs a print processing of print data; a control portion 52 that is constituted by such as a CPU, a ROM, and a RAM, and that controls operations of devices; an operation portion 53 that performs such as an operation of printing print data; a storage portion 54 constituted by such as a hard disc, that stores print data 541; and a network I/F 55 that is connected to the print server 4 and the PC 6 through a network. Further, the control portion 52 is constituted by a print data storage management portion 521 that stores and manages the print data 541 transmitted from the print data transmission portion 414 of the print server 4 in the storage portion 54; and a print notification portion 522 that transmits a print start notification or a print completion notification to the print server 4 or other printers when a print instruction is made by a user.

When the operation portion 53 receives a print instruction of the print data 541 stored in the storage portion 54 from a user, the printer 5a performs a print processing of the print data 541 by the image forming portion 51. In the case of a hold printing, a password is inputted from such as ten keys included in the operation portion 53 by a user, and an authentication processing thereof is performed by the control portion 52. Password information associated with the print data is previously transmitted together with the print data to each of the printers from the print server 4, and held by each of the printers.

When the print processing is completed by the image forming portion 51, the print notification portion 522 performs a completion notification of the print processing to the print server 4. At this time, the print notification portion 522 may perform the print completion notification not only in the print job units, but for every page in which the printing is completed, or for every predetermined page. Further, the print notification portion 522 may perform a start notification of the print processing to the print server 4 when the print processing is started by the image forming portion 51. Hereinafter, the print completion notification or the print start notification is referred to as a print notification. The print notification may include information about the amount of print data that the printing is completed in the print data (for example, print completion to page 2).

FIG. 20 is a diagram showing an example of a print data management table stored in the storage portion 42 of the print server 4. The print data transmission portion 414 of the print server 4 controls a transmission processing of print data based on the print data management table stored in the storage portion 42.

The print data management table shown in FIG. 20 manages such as identification information of a portable terminal, user position information, a transmission destination printer, a transmission page, and a type of print data, with respect to each print data. Position information (not shown) of each of the printers on a network is registered in the print data management table beforehand, a distance between each of the printers can be obtained if the user position information is recognized. Thereby, it is possible for the print server 4 to extract printers near a current position of the user.

According to the present example, in the print data of "001", user position information is obtained from a portable terminal having an electronic mail address (ooox@abc.ne.jp), and 10 pages are transmitted to a printer with an IP address 1, and 5 pages are transmitted to a printer with an IP address 2, respectively. In this way, the print data transmission portion 414 may transmit a part of the print data in accordance with a printing order of the print data, causing the printer to hold the part of the print data.

Figure 21:
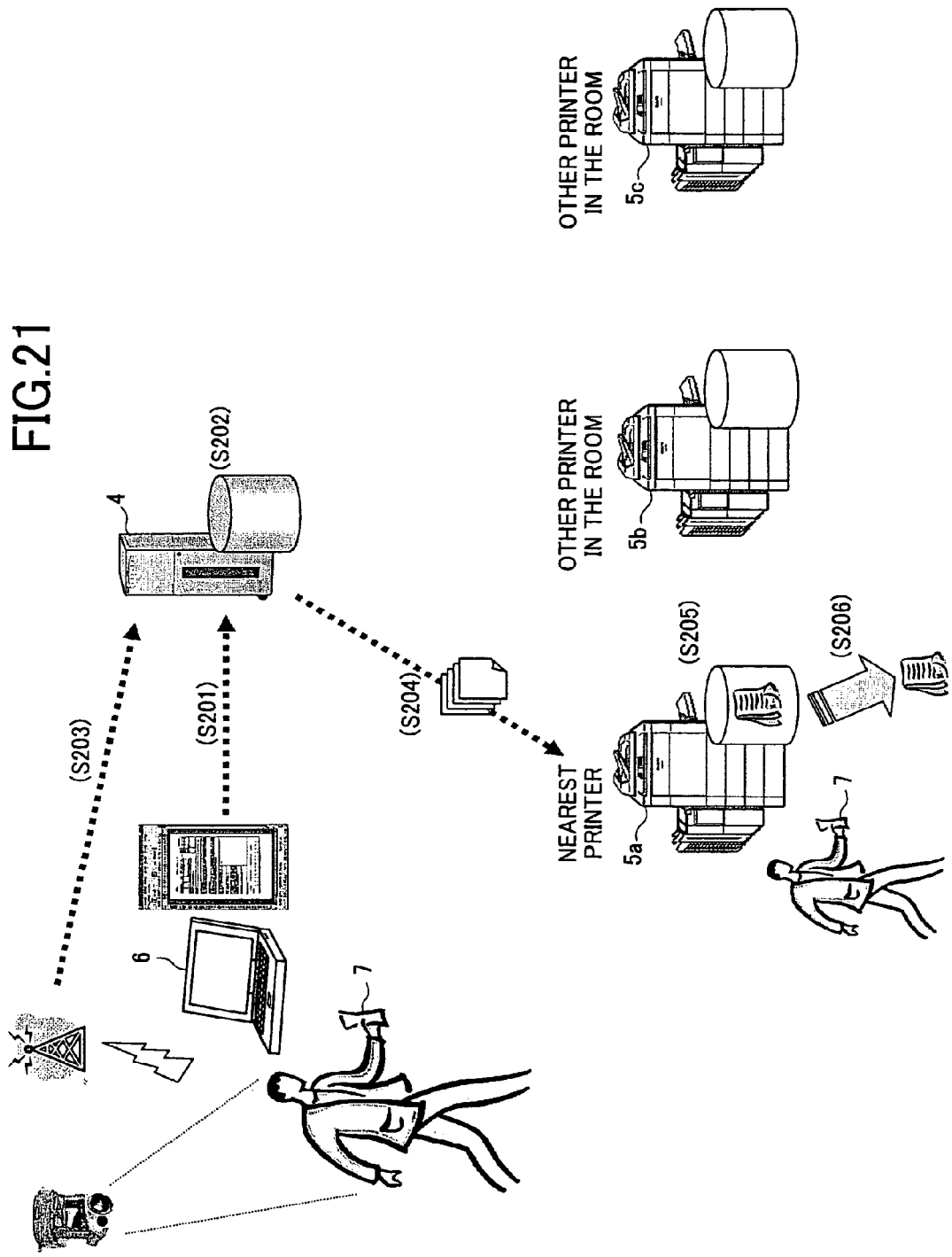
FIG. 21 is a diagram for explaining an example of the hold print processing flow according to the print control system of the present invention.

FIG. 21 is a diagram for explaining an example of the hold print processing flow according to the print control system of the present invention. In the print server 4 shown in the present example, when a user performs a print operation from the PC 6, print data is automatically transmitted to a printer nearest to a current position of the user to be held. Then, just by moving to the nearest printer and performing an output operation, the user can print out desired print data.

First, when a user performs a print operation from the PC 6, all of the print data is transmitted to the print server 4 (S201), and the print server 4 stores the print data from the PC 6 in the storage portion 42 (S202). Further, the print server 4 obtains user position information from the portable terminal 7 (S203), and extracts the printer 5a that is nearest to the user position of the plurality of printers 5a, 5b and 5c.

The print server 4 transmits the print data (herein, all pages) stored in the storage portion 42 to the nearest printer 5a (S204). The printer 5a stores the print data received from the print server 4 in the storage portion 54 (S205). Then, the user inputs a password from the operation portion 53 of the printer 5a to print out necessary print data from the printer 5a (S206).

Figure 22:
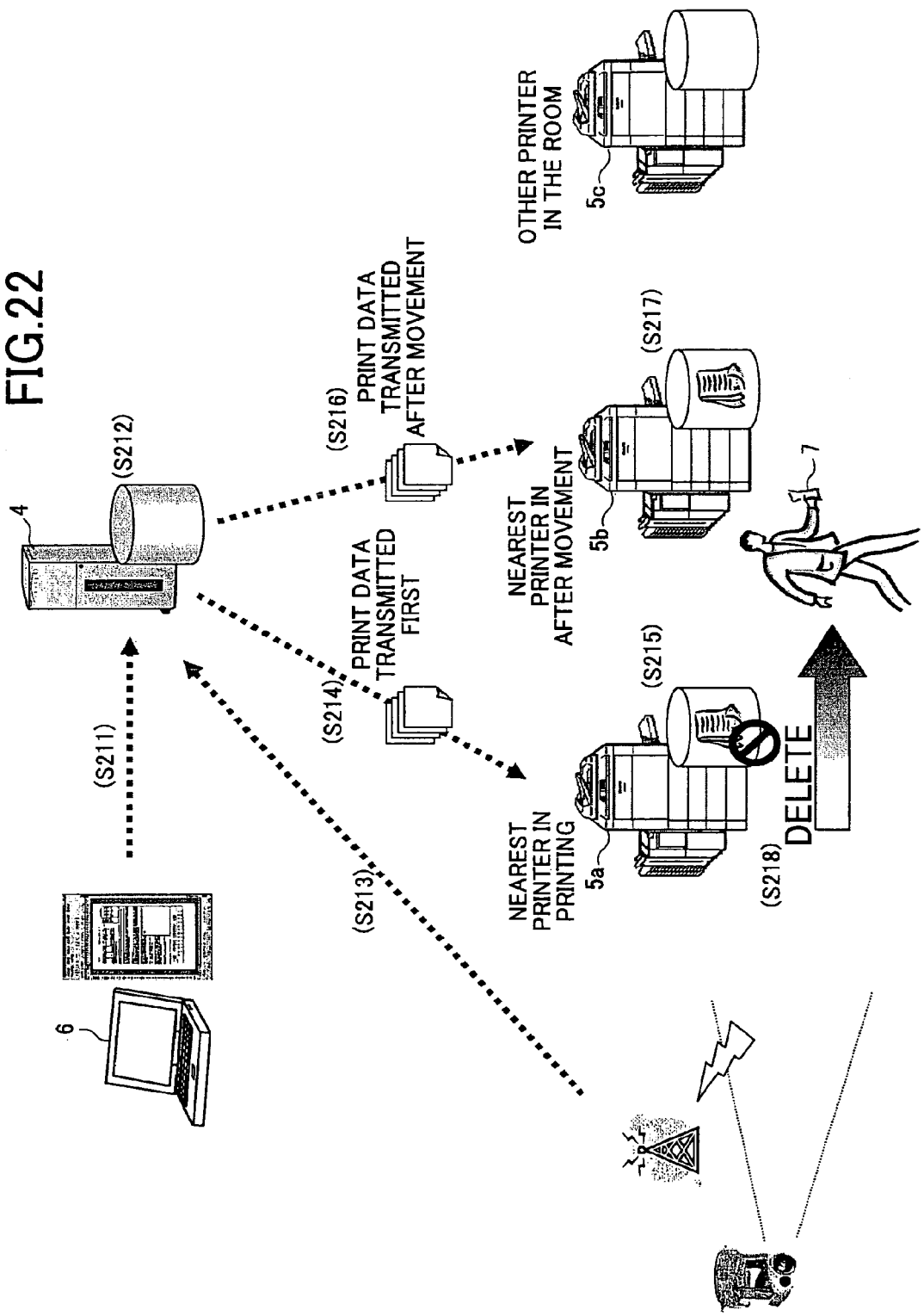
FIG. 22 is a diagram for explaining another example of the hold print processing flow according to the print control system of the present invention.

FIG. 22 is a diagram for explaining another example of the hold print processing flow according to the print control system of the present invention. Although basic processing flow is same as the example in FIG. 21, it is different in terms of that when the user moves and the nearest printer is changed, print data is transmitted to another nearest printer and all or part of the print data in the printer that stores the print data but that is positioned farther from the user is deleted.

First, when a user performs a print operation from the PC 6, all of the print data is transmitted to the print server 4 (S211), and the print server 4 stores the print data from the PC 6 in the storage portion 42 (S212). Further, the print server 4 obtains user position information from the portable terminal 7 (S213), and extracts the printer 5a that is nearest to the user position of the plurality of printers 5a, 5b and 5c.

The print server 4 transmits the print data (herein, all pages) stored in the storage portion 42 to the nearest printer 5a (S214). The printer 5a stores the print data received from the print server 4 in the storage portion 54 (S215).

Then, when the user moves and the nearest printer is changed from the printer 5a to the printer 5b, the print server 4 transmits the print data to the new nearest printer 5b (S216). The printer 5b stores the print data received from the print server 4 in the storage portion (S217). As a result, the print data in the printer 5a that stores the print data but that is positioned farther from the user is deleted (S218), which is performed based on a deletion instruction from the print server 4.

In the above processing, the storage portion 42 stores a history about the user position information obtained by the user position information acquisition portion 416. When the user position information obtained by the user position information acquisition portion 416 is different from the previous user position information stored in the storage portion 42, the transmission destination printer extraction portion 412 newly extracts a printer (herein, the printer 5b) to be a transmission destination of the print data based on the obtained user position information. When a printer is newly extracted by the transmission destination printer extraction portion 412, the print data deletion instruction portion 415 instructs the extracted printer (herein, the printer 5a) that is extracted based on the previous user position information to delete the print data.

Figure 23:
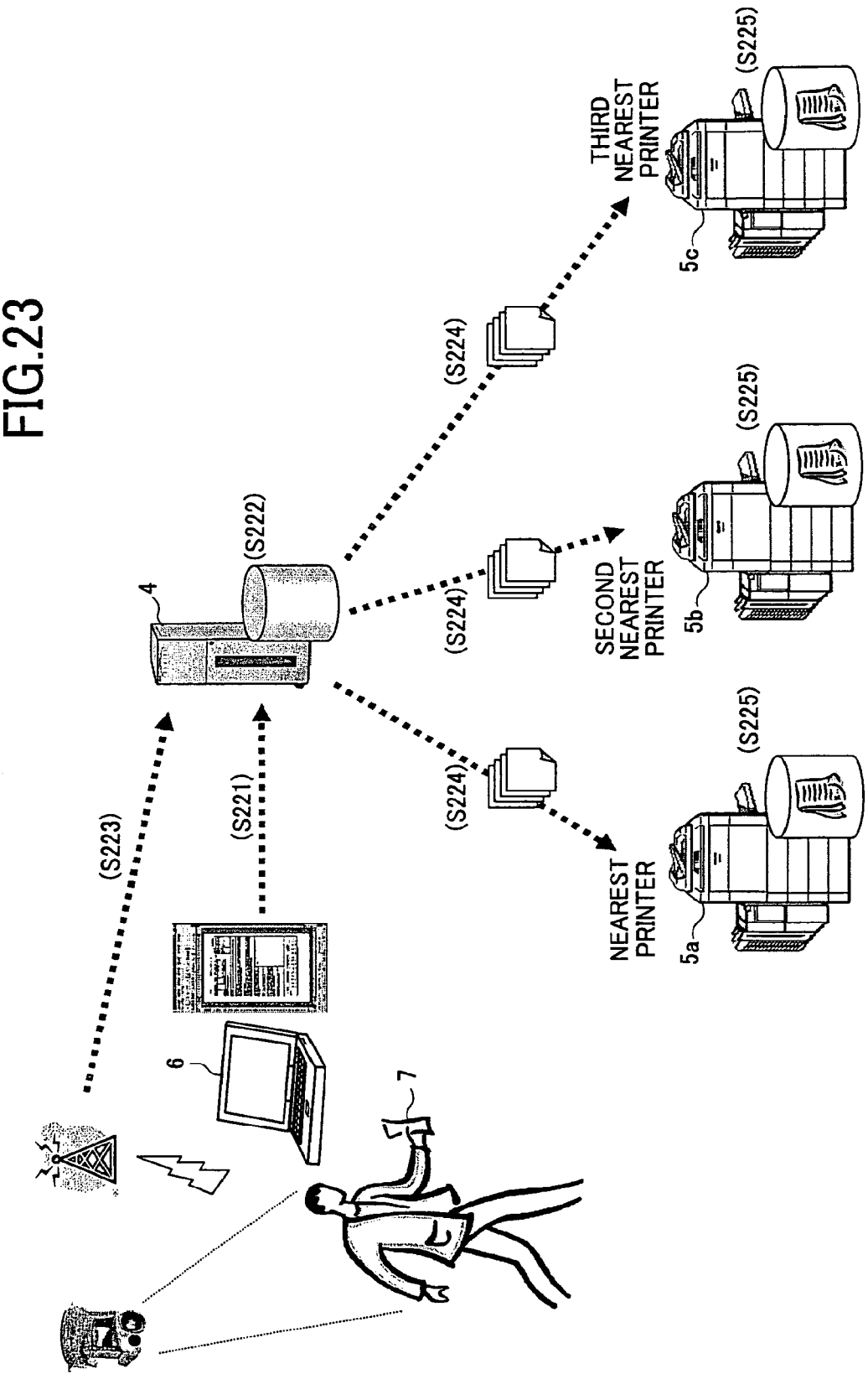
FIG. 23 is a diagram for explaining another example of the hold print processing flow according to the print control system of the present invention.

FIG. 23 is a diagram for explaining another example of the hold print processing flow according to the print control system of the present invention. Although basic processing flow is same as the example in FIG. 21, it is different in terms of that print data is transmitted not only to a printer that is nearest to a user, but to a plurality of printers that are near to the user.

First, when a user performs a print operation from the PC 6, all of the print data is transmitted to the print server 4 (S221), and the print server 4 stores the print data from the PC 6 in the storage portion 42 (S222). Further, the print server 4 obtains user position information from the portable terminal 7 (S223), and extracts a plurality of printers that are near to the user position of the printers on a network.

Herein, the printers 5a, 5b and 5c, up to the third printer in an order of nearer to the user, are extracted.

The print server 4 transmits the print data (herein, all pages) stored in the storage portion 42 simultaneously to each of the printers 5a, 5b and 5c (S224). Each of the printers 5a, 5b and 5c stores the print data received from the print server 4 in the storage portions (S225).

Then, the user inputs a password from the operation portion of any one of printers 5a, 5b and 5c to print out necessary print data from a desired printer.

Figure 24:
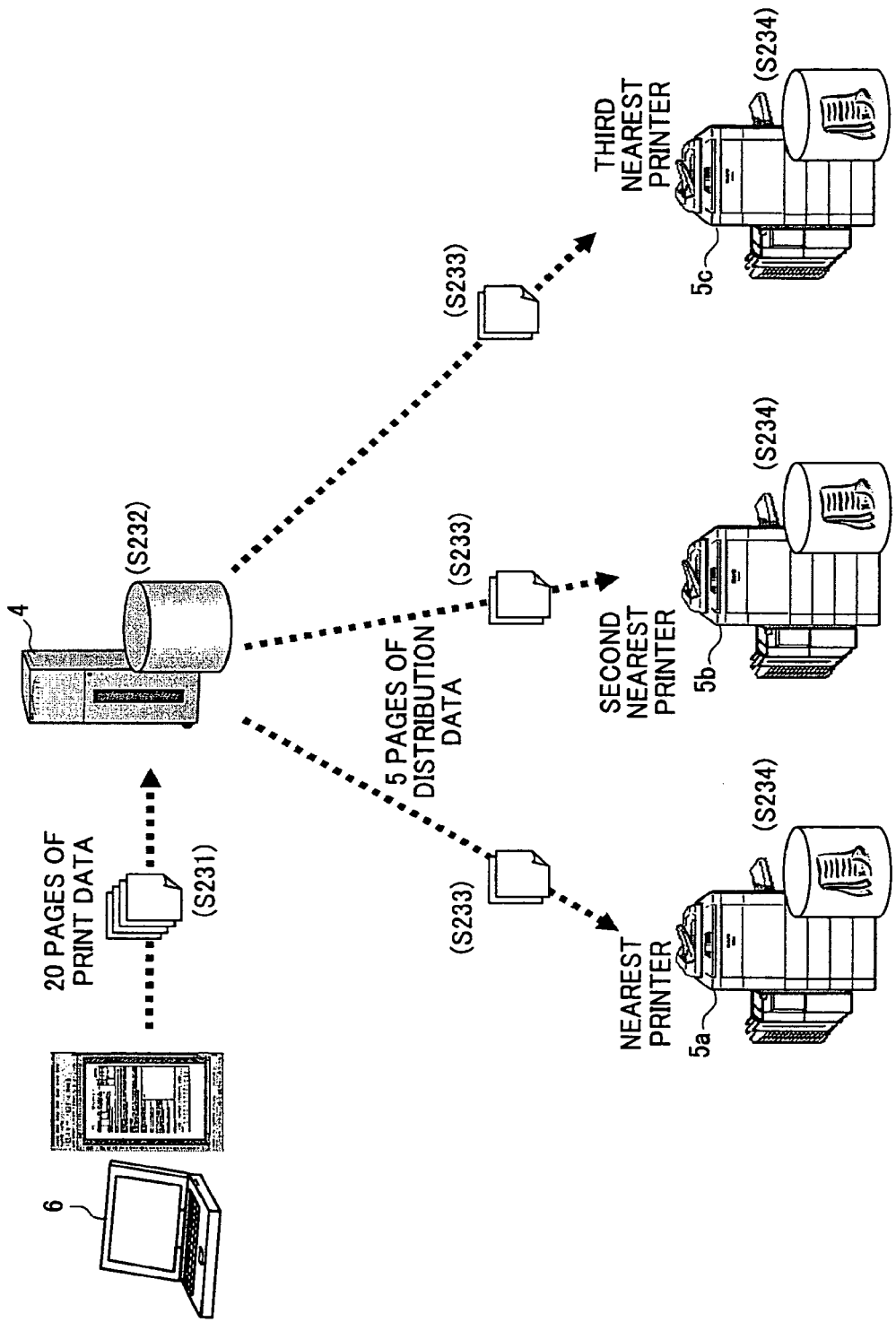
FIG. 24 is a diagram for explaining another example of the hold print processing flow according to the print control system of the present invention.

FIG. 24 is a diagram for explaining another example of the hold print processing flow according to the print control system of the present invention. Although basic processing flow is same as the example in FIG. 23, it is different in terms of that only a first plurality of pages of print data is transmitted to a plurality of printers near to a user.

First, when a user performs a print operation from the PC 6, all of the print data is transmitted to the print server 4 (S231), and the print server 4 stores the print data from the PC 6 in the storage portion 42 (S232). Further, the print server 4 obtains user position information from the portable terminal 7, and extracts a plurality of printers that are near to the user position of the printers on a network. Herein, the printers 5a, 5b and 5c, up to the third printer in an order of nearer to the user, are extracted. Note that, the print data herein has 20 pages in total.

The print server 4 transmits a first plurality of pages (herein, 5 pages) of the print data stored in the storage portion 42 simultaneously to each of the printers 5a, 5b and 5c (S233). Each of the printers 5a, 5b and 5c stores the print data (5 pages) received from the print server 4 in the storage portions (S234).

In the above processing, the print data transmission portion 414 transmits a part of the print data to each of the printers 5a, 5b and 5c in accordance with a print order of the print data, causing each of the printers 5a, 5b and 5c to hold the part of the print data.

In this way, not all pages of the print data, but a start page, or several pages from the start page of the print data is previously held by the printers, and thereby it is possible to use the storage capacity more efficiently compared with a case when all of the print data is held by each of the printers.

When printing from an end page in a face-up print, several pages from the end page of the print data may be previously held by the printers.

In this way, when the first plurality of pages of the print data is transmitted to the plurality of printers near to the user, the plurality of pages are transmitted in a printing order from the print start page, regardless of the page number.

Figure 25:
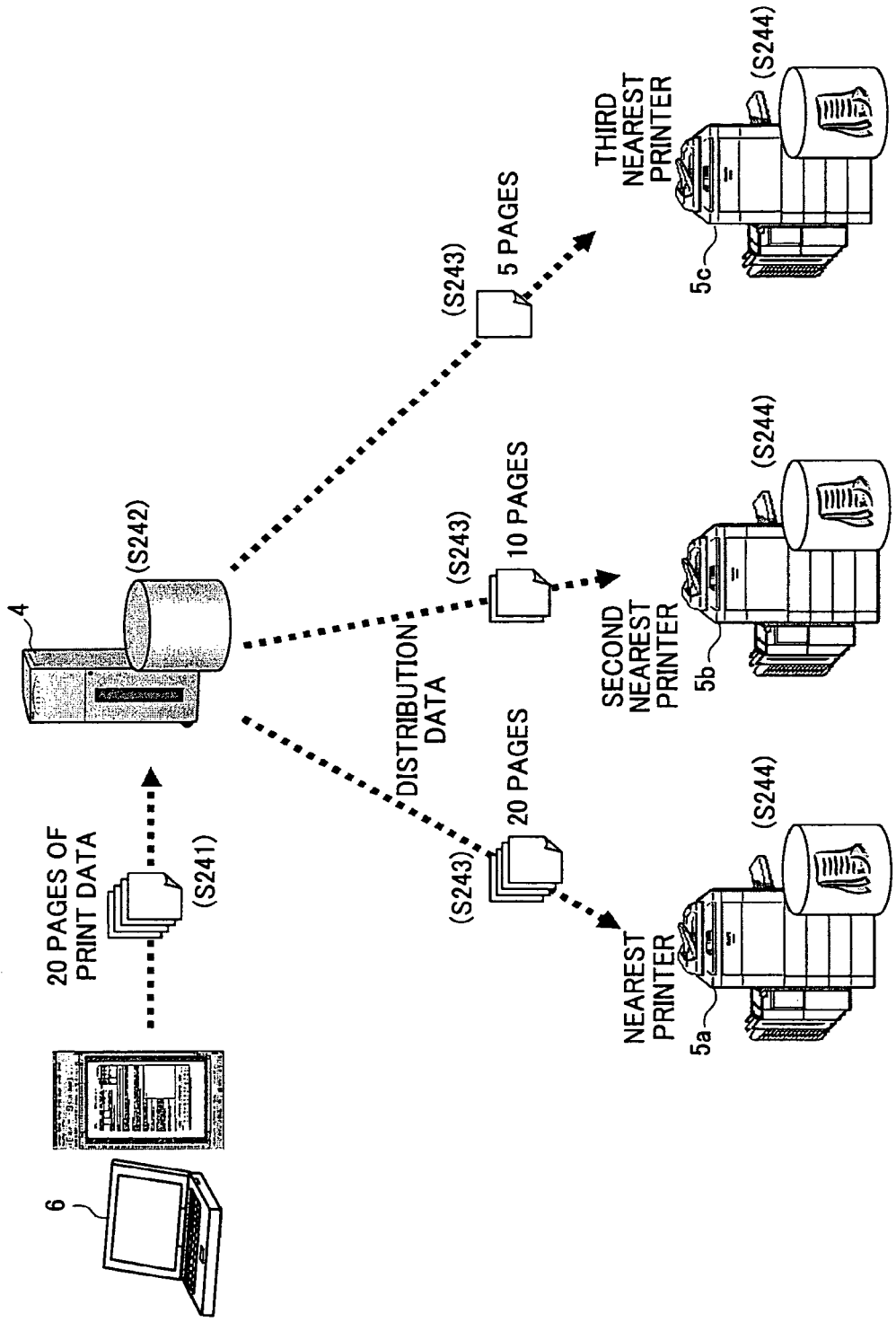
FIG. 25 is a diagram for explaining another example of the hold print processing flow according to the print control system of the present invention.

FIG. 25 is a diagram for explaining another example of the hold print processing flow according to the print control system of the present invention. Although basic processing flow is same as the example in FIG. 24, it is different in terms of that the transmission amount of print data is weighted depending on a distance between a user and each of the printers.

First, when a user performs a print operation from the PC 6, all of the print data is transmitted to the print server 4 (S241), and the print server 4 stores the print data from the PC 6 in the storage portion 42 (S242). Further, the print server 4 obtains user position information from the portable terminal 7, and extracts a plurality of printers that are near to the user position of the printers on a network. Herein, the printers 5a, 5b and 5c, up to the third printer in an order of nearer to the user, are extracted. The print data herein has 20 pages in total.

The print server 4 simultaneously transmits different amounts of the print data among the print data stored in the storage portion 42, depending on a distance between each of the printers 5a, 5b and 5c (S243). Herein, the printer 5a is the nearest printer so that 20 pages of the print data is transmitted thereto, the printer 5b is the second nearest printer so that 10 pages of the print data is transmitted thereto, and the printer 5c is the third nearest printer so that 5 pages of the print data is transmitted thereto. Then, each of the printers 5a, 5b and 5c stores each of the print data (herein, 20 pages, 10 pages, and 5 pages, respectively) received from the print server 4 in the storage portions (S244).

In the above processing, the print data transmission portion 414 differentiates the transmission amount of print data to each of the printers 5a, 5b and 5c, depending on a distance between the user position based on the user position information and each of the printers 5a, 5b and 5c. At this time, it is highly possible that the printer nearest to the user position is caused to perform the print output, and therefore the amount of the print data to be stored is increased so that the print output processing can be performed efficiently.

Figure 26A:
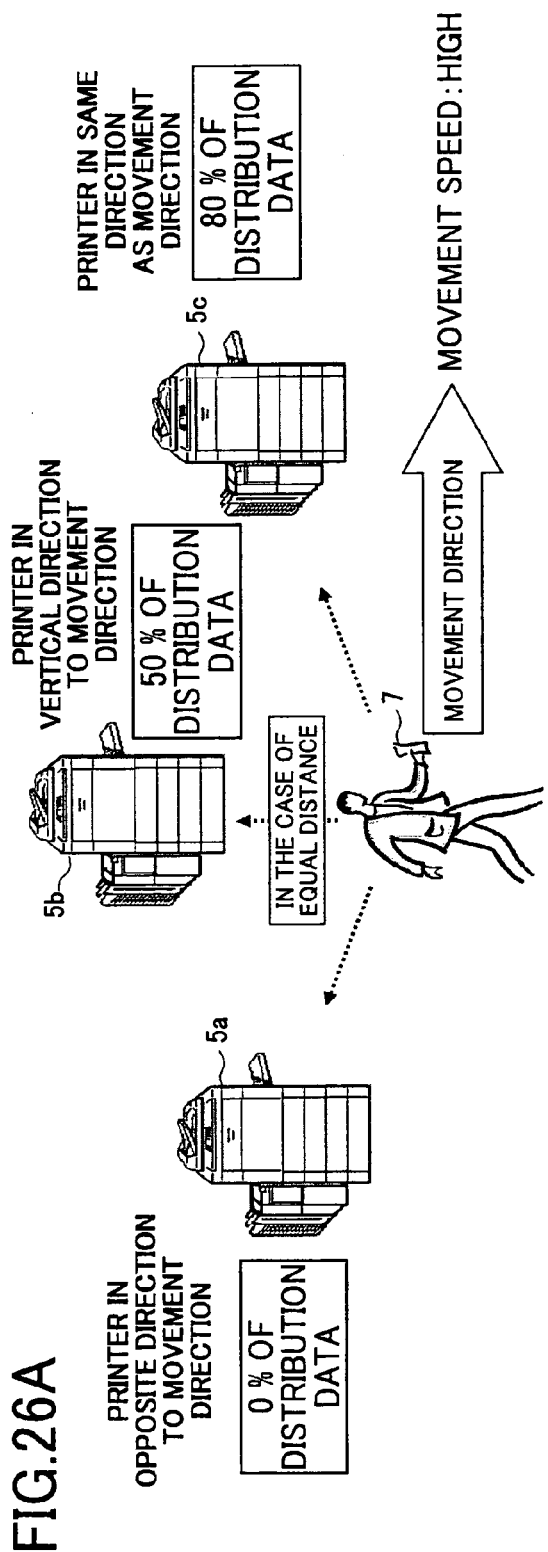
FIGS. 26A and 26B are diagrams for explaining another example of the hold print processing flow according to the print control system of the present invention.
Figure 26B:
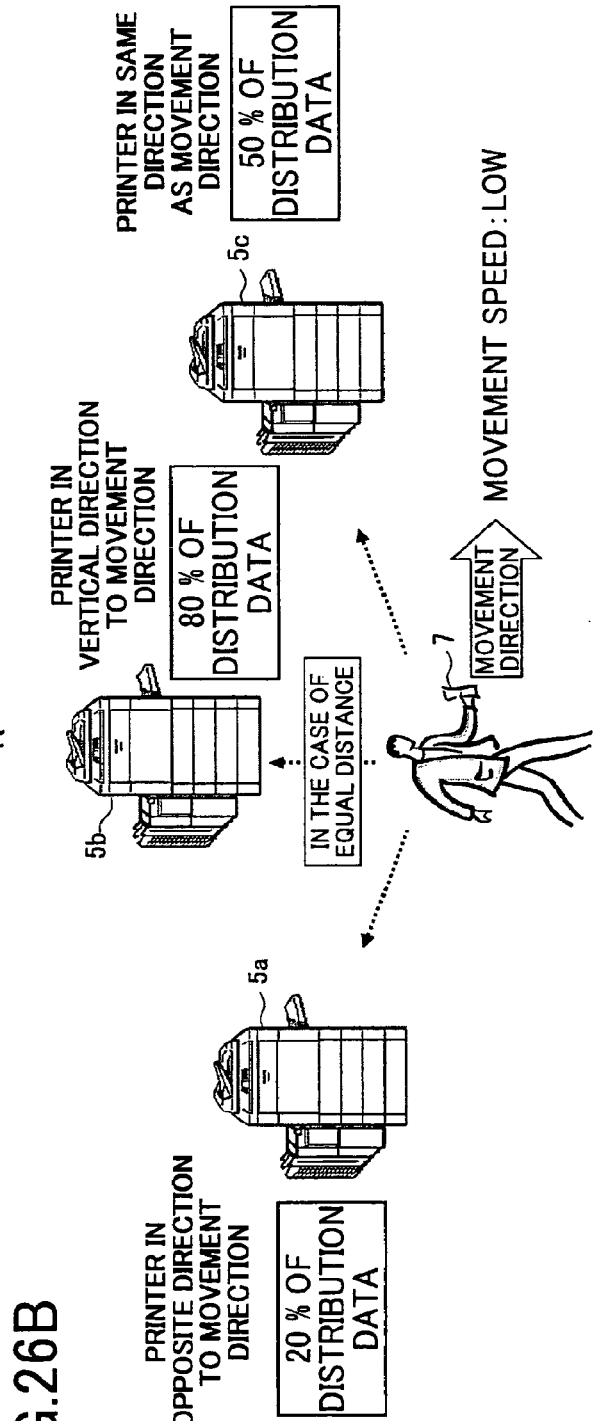

FIGS. 26A and 26B are diagrams for explaining another example of the hold print processing flow according to the print control system of the present invention. Although basic processing flow is same as the example in FIG. 24, it is different in terms of that when a user is moving, the amount of print data to be transmitted to each of the printers is weighted depending on information of =migration route of the user, in other words, a distance from the user to printers, a movement speed of the user, and a movement direction of the user.

In FIG. 26A, the printers 5a, 5b and 5c are arranged at equal distance from the user. When the user is moving at a high speed (brisk walking, or galloping) in a direction of an arrow in FIG. 26A, the printer 5a is located in an opposite direction to the movement direction, and therefore there is little possibility that the print output is performed in the printer 5a and no print data is transmitted thereto. Further, the printer 5b is located in a vertical direction to the movement direction, and therefore "50%" of the print data is transmitted thereto. Further, the printer 5c is located in a same direction as the movement direction and the user is moving at a high speed, and therefore the printer 5c is most likely to perform the print output. Thus, "80%" of the print data is transmitted thereto.

In FIG. 26B, the printers 5a, 5b and 5c are arranged at equal distance from the user. When the user is moving at a low speed (normal walking) in a direction of an arrow in FIG. 26B, the printer 5a is located in an opposite direction to the movement direction, and therefore "20%" of the print data is transmitted thereto. Further, the printer 5b is located in a vertical direction to the movement direction and the user is moving at a low speed, and therefore the printer 5b is most likely to perform the print output. Thus, "80%" of the print data is transmitted thereto. Further, the printer 5c is located in a same direction as the movement direction, and therefore "50%" of the print data is transmitted thereto.

In the above processing, the transmission destination printer extraction portion 412 obtains information of the migration route of the user (such as a distance from a user to printers, a movement speed of a user, and movement direction of a user) from a history of the user position information stored in the storage portion 42. Then, based on the information of the migration route, printers to be a transmission destination of the print data are extracted.

Subsequently, the print data transmission portion 414 weights the amount of the print data to be transmitted to each of the printers 5a, 5b and 5c extracted by the transmission destination printer extraction portion 412, based on the information of the migration route.

Typically, it is considered that there is a high possibility that printers on the migration route of the user are instructed to print. Then, based on the information of the migration route, printers having a high possibility of being instructed to print are identified to transmit the print data by increasing the amount of the print data in a descending order of the possibility.

FIG. 27 is a diagram for explaining another example of the hold print processing flow according to the print control system of the present invention. Although basic processing flow is same as the example in FIG. 24, it is different in terms of that when a first plurality of pages of print data is transmitted to each of the printers and thereafter a printer print-instructed by a user performs the print output, the print server 4 transmits remaining pages of the print data to the printer.

First, when a user performs a print operation from the PC 6, all of the print data is transmitted to the print server 4 (S251), and the print server 4 stores the print data from the PC 6 in the storage portion 42 (S252). Further, the print server 4 obtains user position information from the portable terminal 7, and extracts a plurality of printers that are near to the user position of the printers on a network. Herein, the printers 5a, 5b and 5c, up to the third printer in an order of nearer to the user, are extracted. The print data herein has 20 pages in total.

The print server 4 transmits the first plurality of pages (herein 5 pages) of the print data stored in the storage portion 42 simultaneously to each of the printers 5a, 5b and 5c (S253). Each of the printers 5a, 5b and 5c stores each of the print data (herein 5 pages) received from the print server 4 in the storage portions (S254).

Then, the user inputs a password from the operation portion 53 of the nearest printer 5a to print out necessary print data from the printer 5a (S255). When the user performs a print output from the printer 5a, a print notification thereof is transmitted to the print server 4, and the print server 4 transmits remaining pages (herein, from page 6 to page 20) of the print data to the printer 5a (S256).

In the above processing, in a case where the plurality of printers 5a, 5b and 5c hold the part of the print data, when the print notification is received from any one of the printers 5a, 5b and 5c, the print data transmission portion 414 transmits the remaining pages of the print data to the printer (herein the printer 5a).

Thereby, the printer to which the print instruction is made obtains the remaining print data, while performing a print output of a start page or several pages from the start page of the print data, thus making it possible to perform the print output efficiently.

FIG. 28 is a diagram for explaining another example of the hold print processing flow according to the print control system of the present invention. Although basic processing flow is same as the example in FIG. 23, it is different in terms of that when a user performs a print output in any one of the printers, a print notification thereof is transmitted to the print server 4, and the print server 4 that has received the print notification instructs other printers to delete the print data.

The deletion processing of the print data for other printers may be performed between the printers without using the print server 4. For example, when a print instruction is made to the printer 5a by a user operation, a print notification thereof is transmitted to other printers 5b and 5c from the printer 5a. In response to the print notification, the printers 5b and 5c delete each of the print data. This is an example in the case of the printer 5a, which is also applicable when the print instruction is made for the printers 5b and 5c. The example of FIG. 28 illustrates a case that the deletion processing of the print data is performed between the printers without using the print server 4.

First, when a user performs a print operation from the PC 6, all of the print data is transmitted to the print server 4 (S261), and the print server 4 stores the print data from the PC 6 in the storage portion 42 (S262). Further, the print server 4 obtains user position information from the portable terminal 7, and extracts a plurality of printers that are near to the user position of the printers on a network. Herein, the printers 5a, 5b and 5c, up to the third printer in an order of nearer to the user, are extracted.

The print server 4 transmits the print data stored in the storage portion 42 simultaneously to each of the printers 5a, 5b and 5c (S263). Each of the printers 5a, 5b and 5c stores each of the print data received from the print server 4 in the storage portions (S264).

Then, in the case of the present example, the user inputs a password from the operation portion 53 of the printer 5a to print out necessary print data from the printer 5a (S265). A print notification thereof is transmitted to other printers 5b and 5c from the printer 5a that has performed the print output (S266), and the printers 5b and 5c that have received the print notification delete each of the print data from the storage portions.

In this way, the plurality of printers on the network that are near to the user are caused to hold the print data beforehand, and therefore it is possible to perform a print output of desired print data no matter to which printers a user makes a print instruction. In addition, the print data in the other printers other than the printer print-instructed by the user is automatically deleted, thus making it possible to use the storage capacity of the printer efficiently while attaining the protection of such as confidential documents.

Figure 29:
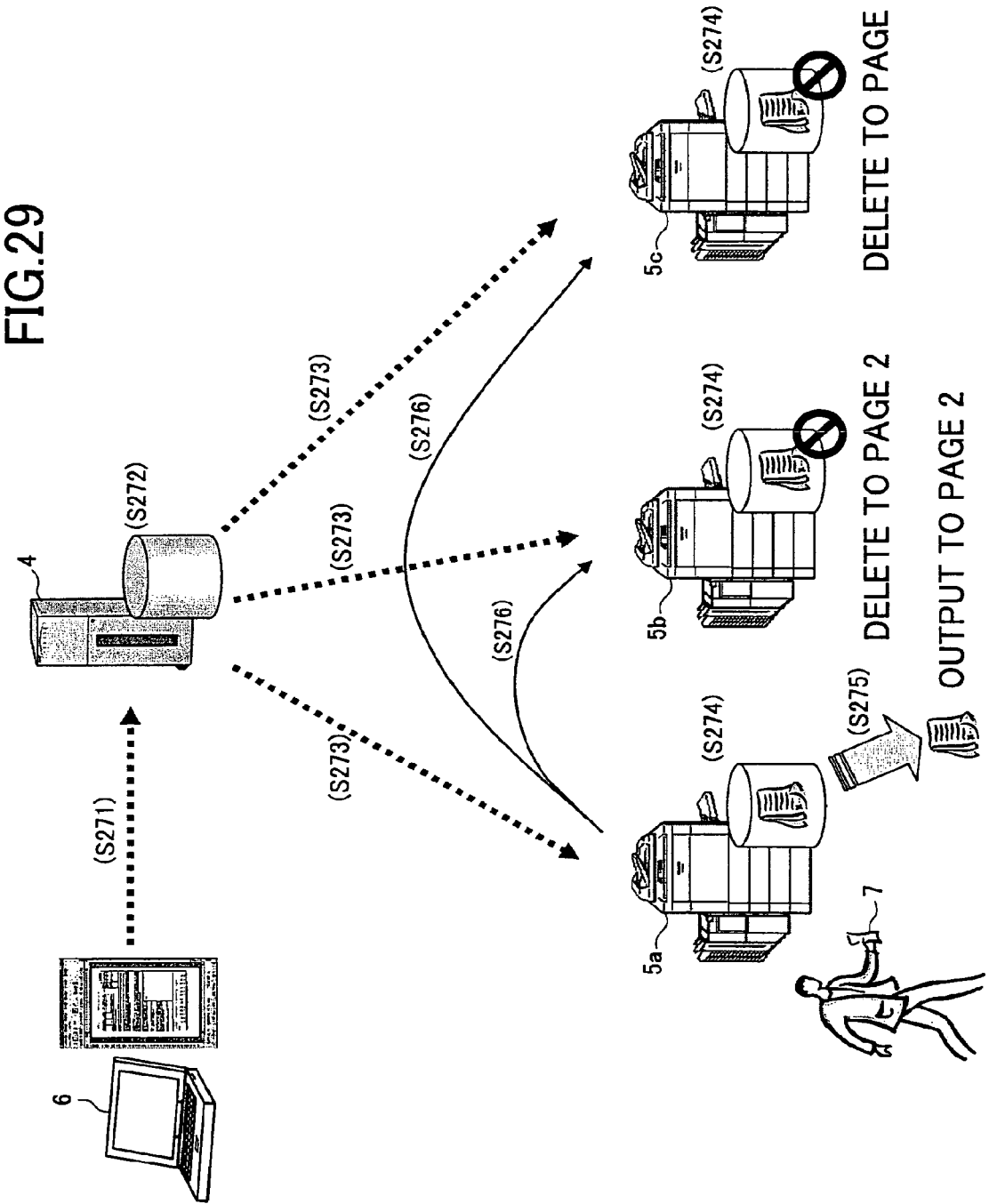
FIG. 29 is a diagram for explaining another example of the hold print processing flow according to the print control system of the present invention.

FIG. 29 is a diagram for explaining another example of the hold print processing flow according to the print control system of the present invention. Although basic processing flow is same as the example in FIG. 28, it is different in terms of that when a user performs an output operation in any one of the printers, a print notification thereof and information of the amount of the print data that the printing is completed in the printer are transmitted together to the print server 4, and the print server 4 that has received the information of the amount of the print data instructs other printers to delete pages that the printing is completed. Similar to the example of FIG. 28, the deletion processing of the print data with respect to other printers may be performed between the printers directly without using the print server 4. The example of FIG. 29 illustrates a case that the deletion processing of the print data is performed without using the print server 4.

First, when a user performs a print operation from the PC 6, all of the print data is transmitted to the print server 4 (S271), and the print server 4 stores the print data from the PC 6 in the storage portion 42 (S272). Further, the print server 4 obtains user position information from the portable terminal 7, and extracts a plurality of printers that are near to the user position of the printers on a network. Herein, the printers 5a, 5b and 5c, up to the third printer in an order of nearer to the user, are extracted.

The print server 4 transmits the print data stored in the storage portion 42 simultaneously to each of the printers 5a, 5b and 5c (S273). Each of the printers 5a, 5b and 5c stores each of the print data received from the print server 4 in the storage portions (S274).

Then, in the case of the present example, the user inputs a password from the operation portion 53 of the printer 5a to print out necessary print data (herein, to page 2) from the printer 5a (S275). A print notification is transmitted from the printer 5a that has performed the print output to other printers 5b and 5c (S276). The print notification includes information of the amount of the print data that the printing is completed by the printer 5a (herein, output to page 2). When the printers 5b and 5c receive the print notification including the information of the amount of the print data that the printing is completed, the printers 5b and 5c delete each of the print data to page 2 from the storage portions, based on the print notification.

Further, as another example, when the print data deletion instruction portion 415 receives a print notification from any one (herein the printer 5a) of the plurality of printers 5a, 5b and 5c, the deletion of the amount of the print data that the printing is completed by the printer 5a may be instructed to the printers 5b and 5c other than the printer 5a, based on information of the amount of the print data that the printing is completed from the printer 5a, included in the print notification.

In this way, the print data that has been simultaneously transmitted is deleted for every unnecessary page without deleting all pages, and thereby it is possible to shorten a time to hold the print data in other printers.

Figure 30:
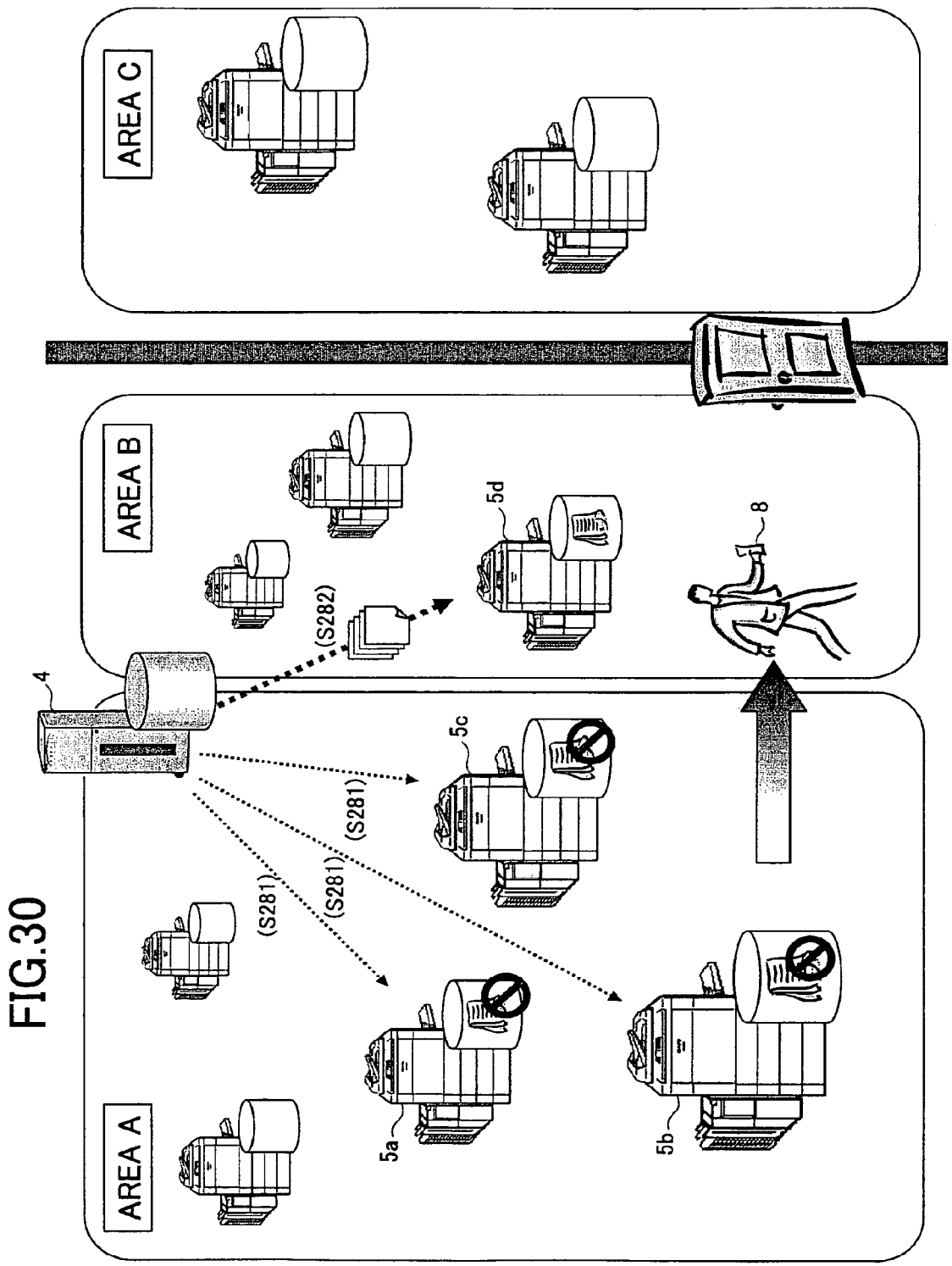
FIG. 30 is a diagram for explaining another example of the hold print processing flow according to the print control system of the present invention.

FIG. 30 is a diagram for explaining another example of the hold print processing flow according to the print control system of the present invention. 8 denotes an IC card for entering and leaving a room. In the case of the present example, each of the printers is classified with an area unit, and when a user leaves an area, printers in the area delete stored print data.

First, the print server 4 needs to recognize an area where the user is. In the case of the area unit, the user position can be recognized by methods other than a portable terminal. For example, the IC card 8 for entering and leaving each area is applicable.

When the print server 4 recognizes that the user uses the IC card 8 to enter an area A, the print server 4 transmits print data to the printers 5a, 5b and 5c in the area A. Then, the printers 5a, 5b and 5c hold the print data from the print server 4 in the storage portions.

Subsequently, when the print server 4 recognizes that the user uses the IC card 8 to leave the area A, the print server 4 instructs the printers 5a, 5b and 5c in the area A to delete the print data stored therein (S281). Further, when it is recognized that the user uses the IC card 8 to enter an area B, the print server 4 transmits the print data to the printer 5d in the area B (S282).

In the above processing, the print server 4 includes the user position information acquisition portion 416 that recognizes an area where the user is by the IC card 8 owned by the user; the transmission destination printer extraction portion 412 that extracts printers in the recognized area; the print data transmission portion 414 that transmits the print data received from the PC 6 to the printers extracted by the transmission destination printer extraction portion 412 to cause the printers to hold the print data; and the print data deletion instruction portion 415 that instructs the printers in the area to delete the print data when it is detected that the user leaves the area.

Figure 31:
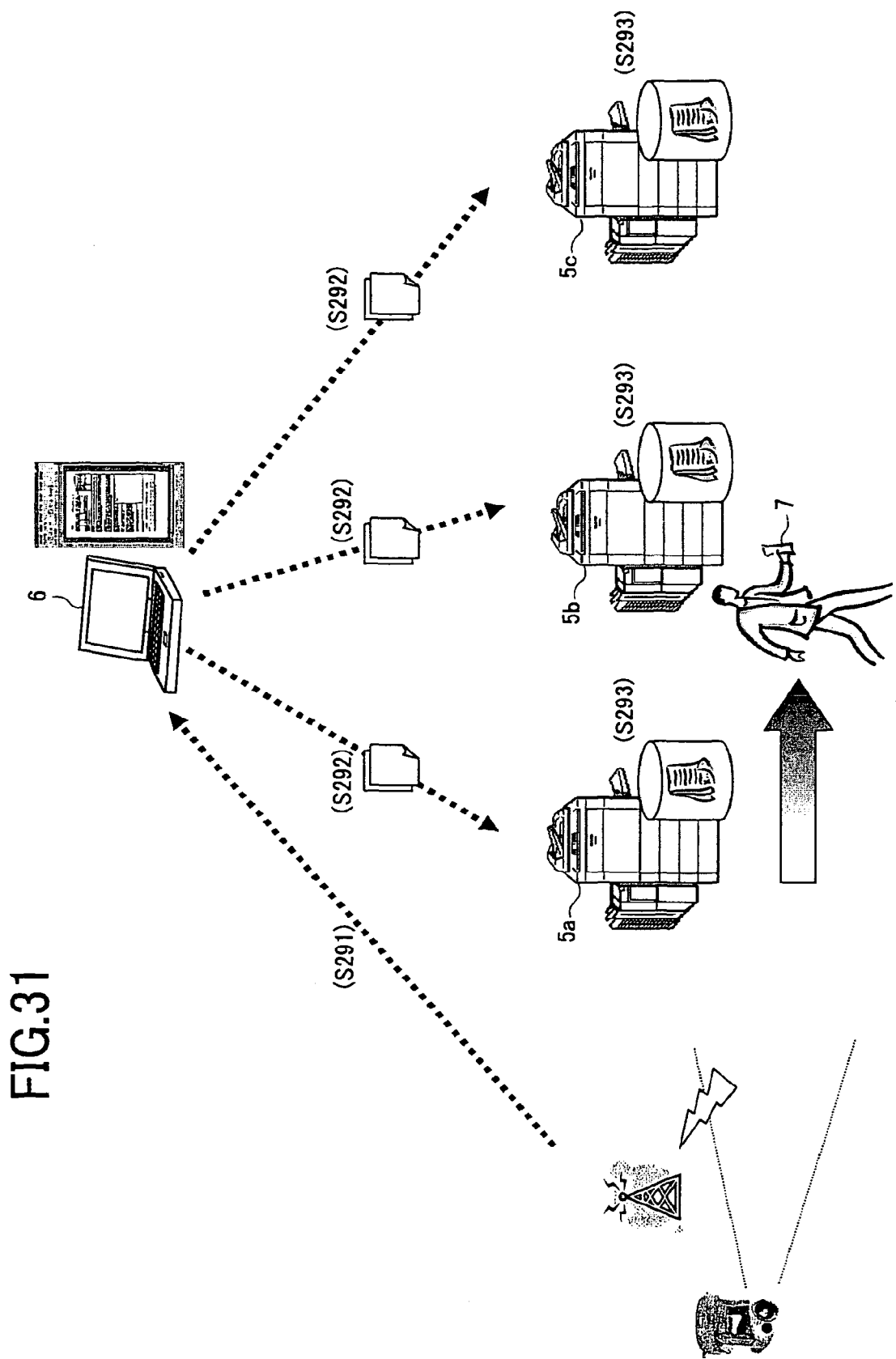
FIG. 31 is a diagram for explaining another example of the hold print processing flow according to the print control system of the present invention.

FIG. 31 is a diagram for explaining another example of the hold print processing flow according to the print control system of the present invention. The present example illustrates a system in which the PC 6 performs a series of transmission processing by the print server 4 in FIG. 28 described above. Description of the deletion processing of print data from the printer print-instructed by a user to other printers will be omitted.

First, the PC 6 obtains user position information from the portable terminal 7 of the user (S291), and extracts a plurality of printers that are near to the user position of the printers on a network. Herein, the printers 5a, 5b and 5c, up to the third printer in an order of nearer to the user, are extracted. When the user performs an print operation from the PC 6, the print data is transmitted simultaneously to each of the printers 5a, 5b and 5c (S292). Each of the printers 5a, 5b and 5c stores the print data received from the PC 6 in the storage portions (S293).

Figure 32:
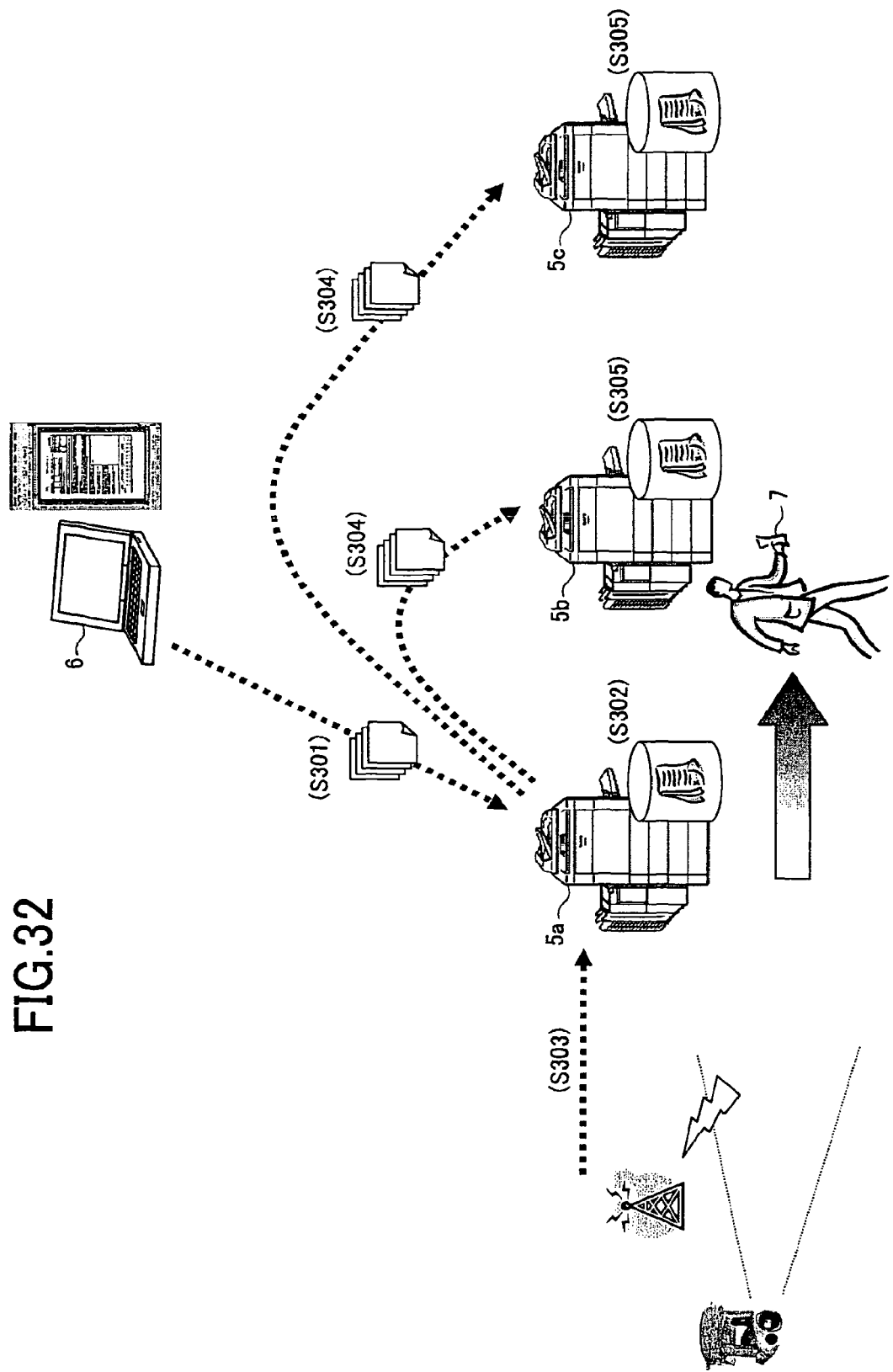
FIG. 32 is a diagram for explaining another example of the hold print processing flow according to the print control system of the present invention.

FIG. 32 is a diagram for explaining another example of the hold print processing flow according to the print control system of the present invention. The present example illustrates a system in which the printer 5a performs a series of transmission processing by the print server 4 in FIG. 28 described above. In other words, the printer 5a includes the transmission destination printer extraction portion 412, the transmission page allocation portion 413, the print data transmission portion 414, the print data deletion instruction portion 415, and the user position information acquisition portion 416, that are included in the print server 4, and can execute functions of the print server 4. Description of the deletion processing of print data from the printer print-instructed by a user to other printers will be omitted.

First, when a user performs a print operation from the PC 6, the print data is transmitted to the printer 5a (S301). The printer 5a stores the print data received from the PC 6 in the storage portion 54 (S302). Further, the printer 5a obtains user position information from the potable terminal 7 (S303), and extracts a plurality of printers that are near to the user position of the printers on a network. Herein, the printers 5b and 5c, up to the second printer in an order of nearer to the user, are extracted.

The printer 5a transmits the print data stored in the storage portion 54 simultaneously to each of the printers 5b and 5c (S304). Each of the printers 5b and 5c stores the print data received from the printer 5a in the storage portions (S305).

Figure 33:
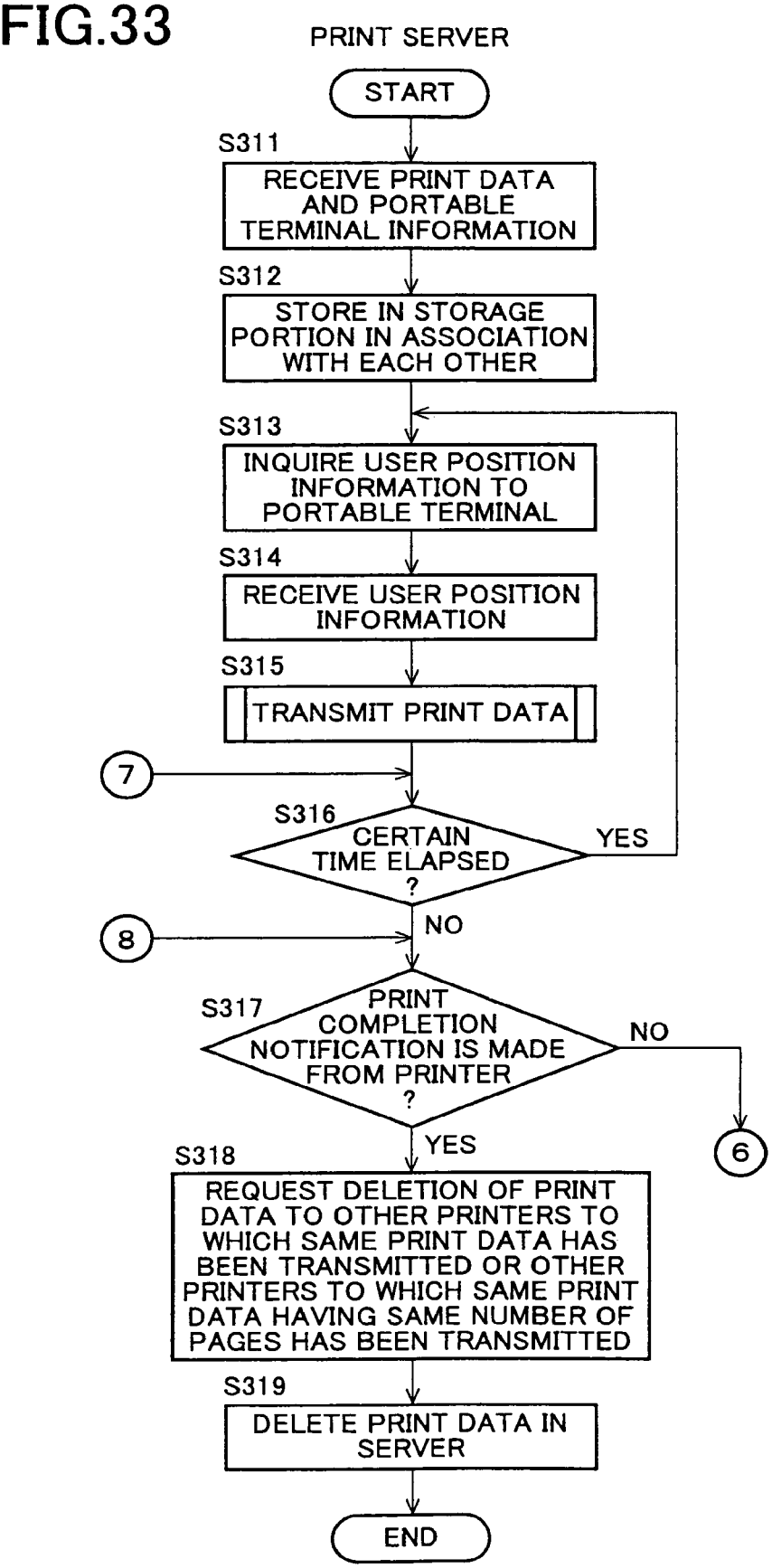
FIG. 33 is a diagram for explaining an example of the print control method by the print server according to the present invention.

FIG. 33 is a flowchart for explaining an example of the print control method by the print server 4 according to the present invention. The description is made based on the system configuration shown in FIG. 19 in the present example. First, the print server 4 receives print data and portable terminal information from the PC 6 (step S311), and then stores the print data and the portable terminal information in association with each other in the storage portion 42 (step S312).

Subsequently, the print server 4 inquires user position information to the portable terminal 7 (step S313), and receives the user position information from the portable terminal 7 (step S314). Then, the print server 4 transmits print data stored in the storage portion 42 to each of the printers 5a, 5b and 5c (step S315). It is determined that whether a certain time has elapsed from the transmission of the print data (step 316), and when the certain time has elapsed (in the case of YES), going back to step S313 to repeat from the processing of inquiring user position information. Alternatively, at step S316, when the certain time has not elapsed (in the case of NO), it is determined that whether a print completion notification is made from any one of the printers 5a, 5b and 5c (step S317).

At step S317, when no print completion notification is made from any of the printers (in the case of NO), the print server 4 moves to step S371 shown in FIG. 38 described below. Whether or not the print notification is made is determined, for example, by the method of determining the presence of a flag indicative of the print notification. The print notification may be made not only in the job units, but for every page, or for every predetermined page. Alternatively, at step S317, when the print completion notification is made, for example, from the printer 5a (in the case of YES), other printers 5b and 5c to which the same print data has been transmitted, or other printers 5b and 5c to which the same print data having same number of pages has been transmitted, are requested to delete the print data (step S318), and the print data in the print server 4 is deleted (step S319).

Figure 34:
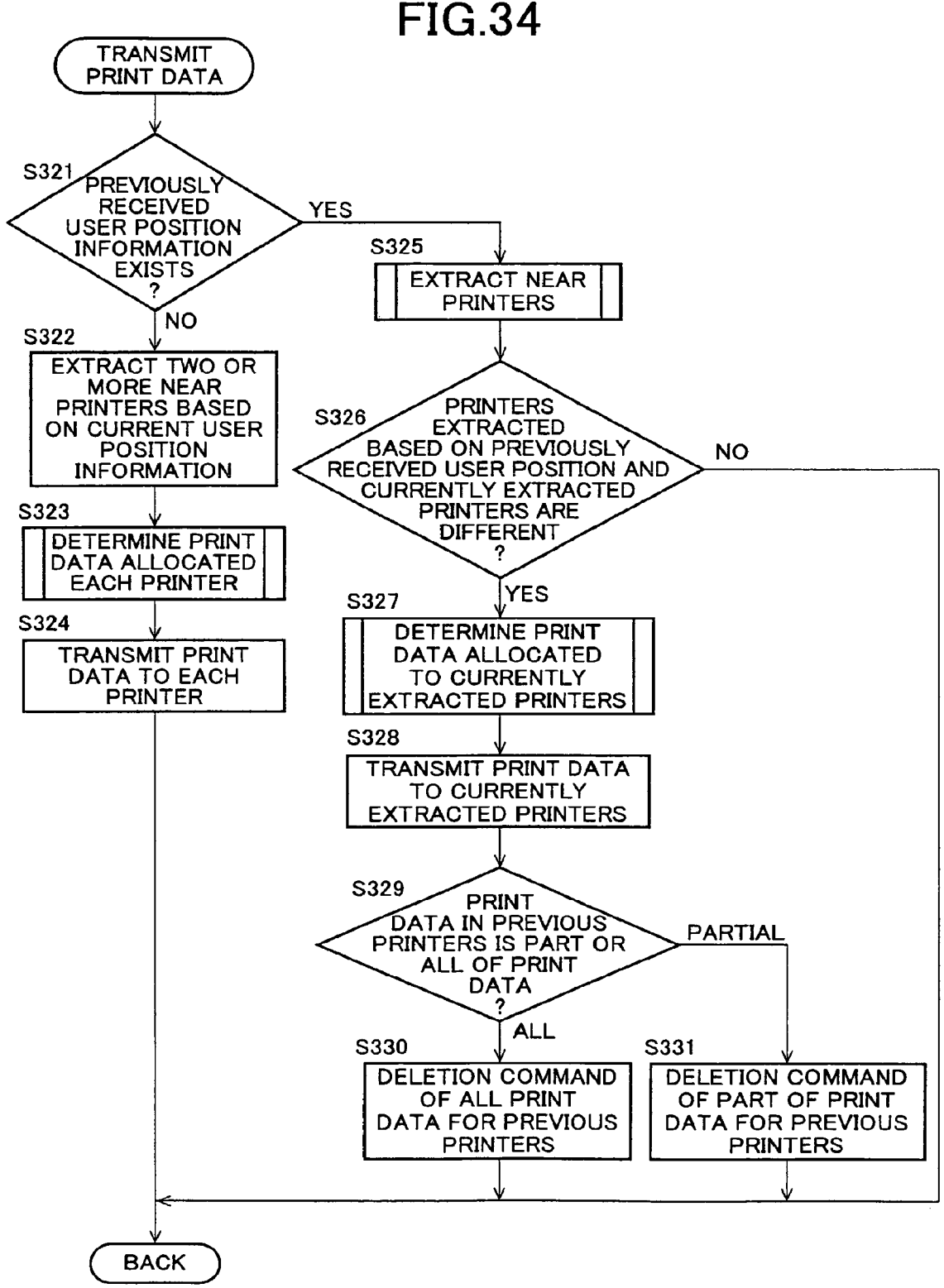
FIG. 34 is a flowchart for explaining an example of a print data transmission processing of step S315 shown in FIG. 33.

FIG. 34 is a flowchart for explaining an example of the print data transmission processing of step S315 shown in FIG. 33. First, the print server 4 determines whether the user position information that has been previously received exists (step S321), and when the previous user position information does not exist (in the case of NO), the print server 4 extracts two or more near printers based on current user position information (step S322). Then, print data to be allocated to each of the printers is determined (step S323), and transmitted to each of the printers (step S324).

Alternatively, when the previous user position information exists at step 321 (in the case of YES), the print server 4 extracts printers near the user position (step S325), and determines whether the printers that have been extracted based on the previously received user position information and the currently extracted printers are different (step S326).

When it is determined that the previous printers and the current printers are different at step S326 (in the case of YES), the print server 4 determines print data to be allocated to the currently extracted printers (step S327). Then, the print data is transmitted to the currently extracted printers (step S328). Alternatively, when it is determined that the previous printers and the current printers are same at step S326 (in the case of NO), the print data is held as it is, followed by moving to BACK.

Subsequently, the print server 4 determines whether the print data in the previous printers is a part or all of the print data (step S329), and when the print data in the pervious printers is all of the print data (in the case of "all" in FIG. 34), the print server 4 transmits a deletion command of all of the print data to the previous printers (step S330). Alternatively, when the print data in the previous printers is a part of the print data (in the case of "partial" in FIG. 34), the print server 4 transmits a deletion command of the part of the print data to the previous printers (step S331).

Figure 35:
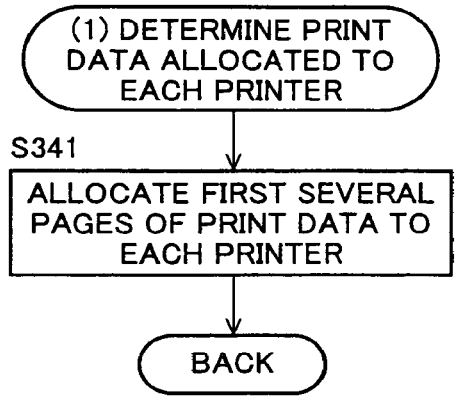
FIG. 35 is a flowchart for explaining an example of a print data allocation processing of steps S323 and S327 shown in FIG. 34.

FIG. 35 is a flowchart for explaining an example of the print data allocation processing of steps S323 and S327 shown in FIG. 34. First, the print server 4 allocates a first several of pages of the print data to each of the printers based on the print data management table shown in FIG. 20 and user position information (step S341).

Figure 36:
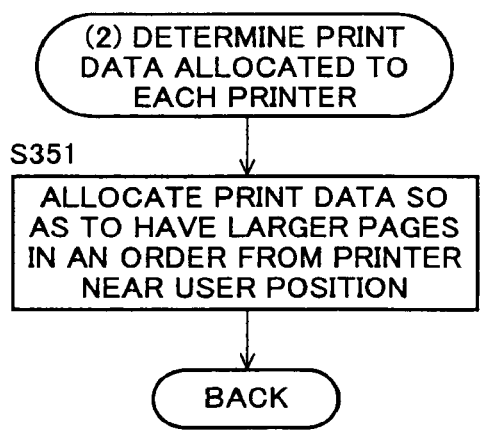
FIG. 36 is a flowchart for explaining another example of the print data allocation processing of steps S323 and S327 shown in FIG. 34.

FIG. 36 is a flowchart for explaining another example of the print data allocation processing of steps S323 and S327 shown in FIG. 34. First, the print server 4 allocates the print data so that the number of pages is larger in an order from a printer near to the user position based on the print data management table and user position information shown in FIG. 20 (step S351).

Figure 37:
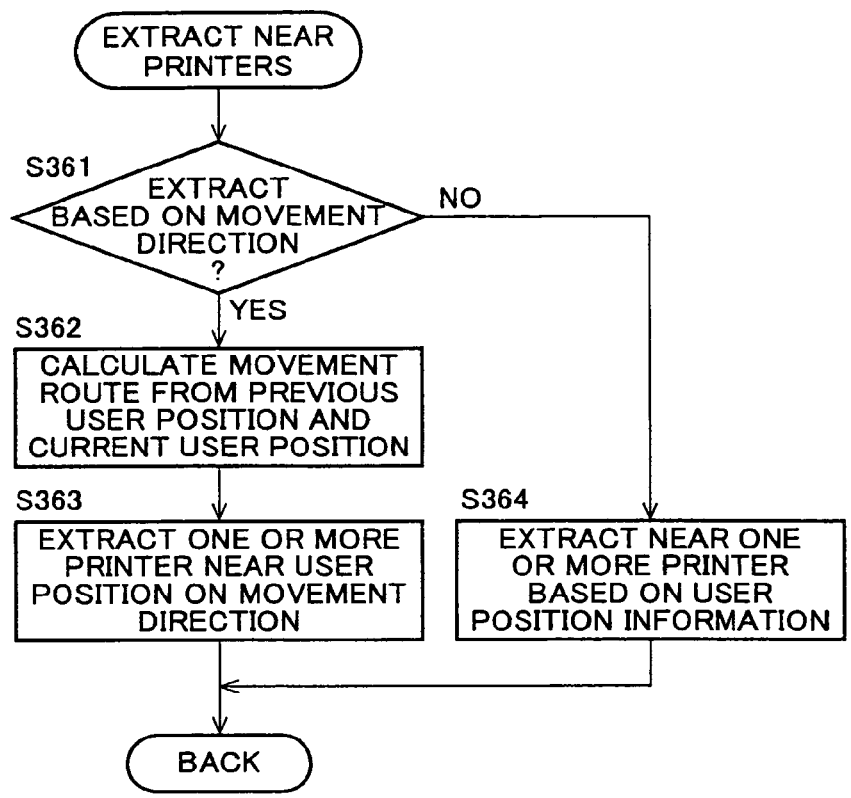
FIG. 37 is a flowchart for explaining an extraction processing of near printers of step S325 shown in FIG. 34.

FIG. 37 is a flowchart for explaining an extraction processing of near printers of step S325 shown in FIG. 34. First, the print server 4 determines whether to extract printers based on the movement direction of the user in accordance with such as a flag (step S361). When printers are extracted based on the movement direction of the user (in the case of YES), a migration route is calculated from the previous user position and the current user position (step S362) to extract one or more printer near the user position on the movement direction (step S363). Alternatively, in the case where the movement direction of the user is not extracted at step S361 (in the case of NO), one or more printer is extracted based on the user position information.

Figure 38:
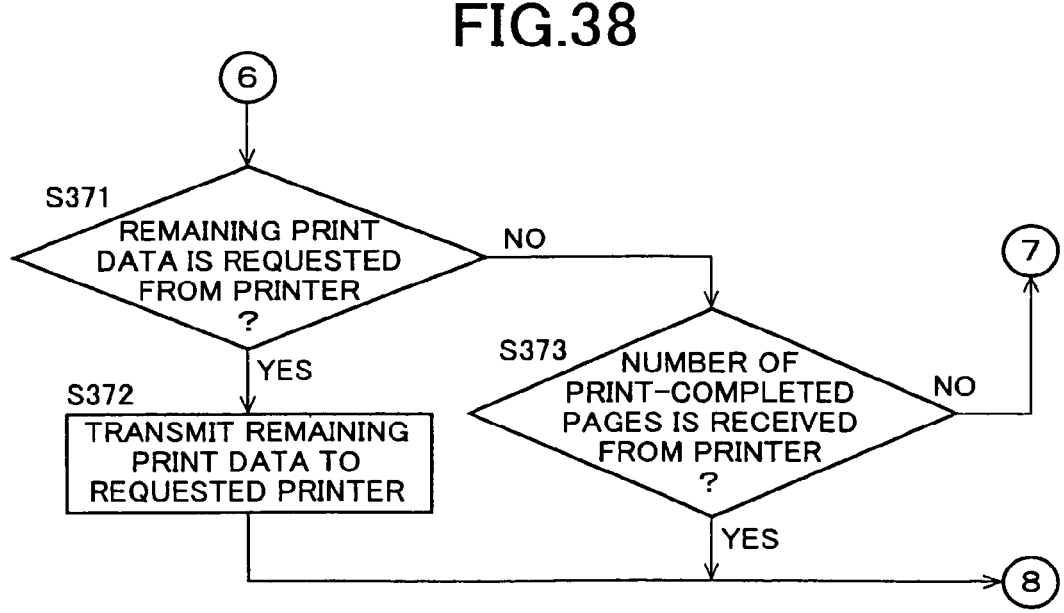
FIG. 38 is a flowchart for explaining a processing when no print notification is made at step S317 shown in FIG. 33.

FIG. 38 is a flowchart for explaining the processing when no print notification is made at step S317 shown in FIG. 33. First, when a print completion notification is made from any one (for example, the printer 5a) of the printers 5a, 5b and 5c at step S317 described above (in the case of YES), the print server 4 determines whether a request for remaining print data is made from the printer 5a (step S371).

When the request for the remaining print data is made from the printer 5a at step S371 (in the case of YES), the print server 4 transmits the remaining print data to the printer 5a that has made the request (step S372), followed by going back to step S317 described in FIG. 33 to repeat the processing. Alternatively, when no request for the remaining print data is made from the printer 5a at step S371 (in the case of NO), it is determined whether the number of pages that the printing is completed is received from the printer 5a (step S373).

When the number of pages that the printing is completed is received from the printer 5a at step S373 (in the case of YES), the print server 4 goes back to step S317 in FIG. 33 to repeat the processing. Alternatively, when the number of pages that the printing is completed is not received from the printer 5a at step S373 (in the case of NO), going back to step S316 in FIG. 33 to repeat the processing.

Figure 39:
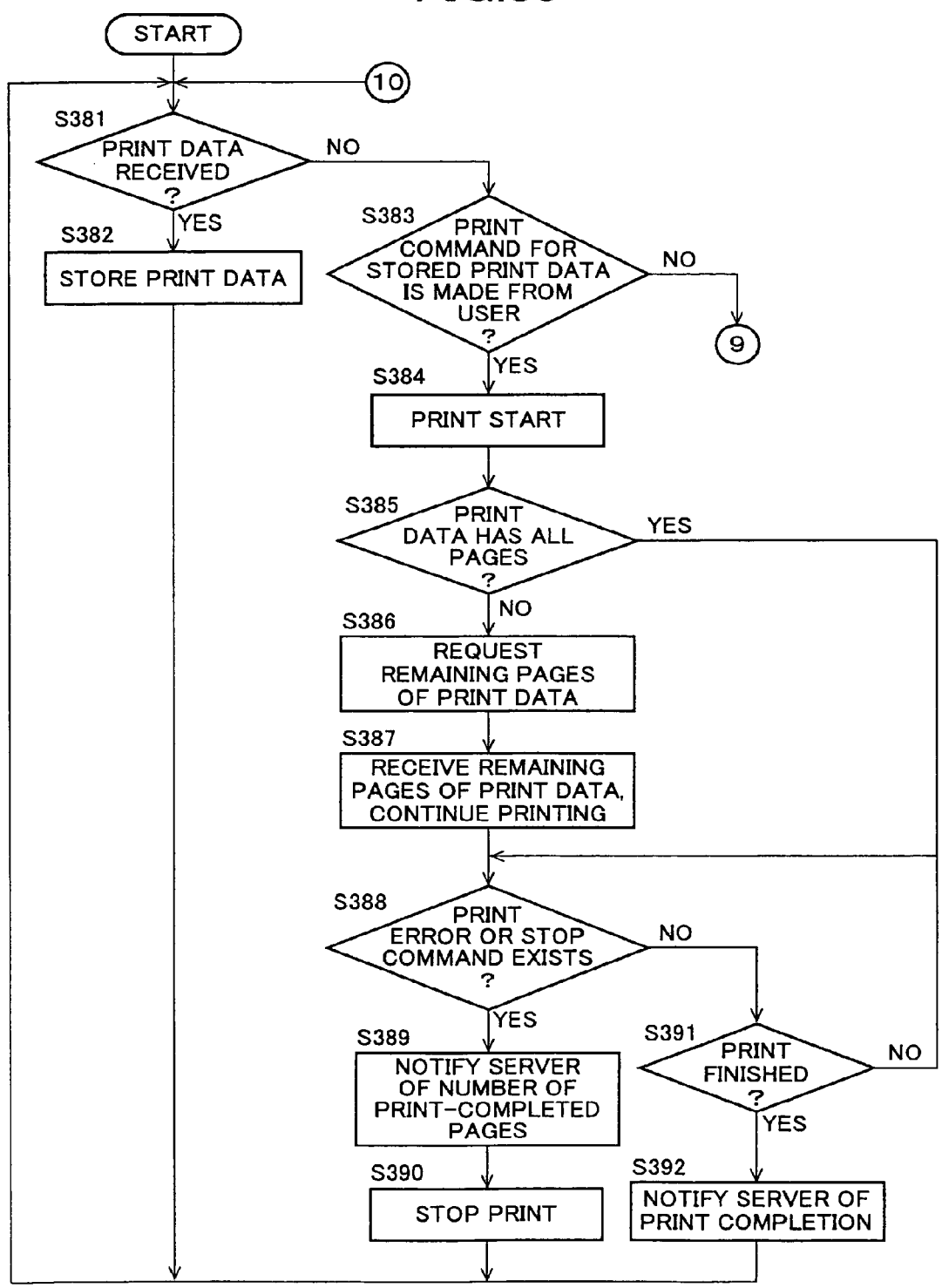
FIG. 39 is a flowchart for explaining an operation example of the printer according to the present invention.

FIG. 39 is a flowchart for explaining an operation example of the printer 5a according to the present invention. The description is made based on the system configuration shown in FIG. 19 in the present example. First, the printer 5a determines whether print data is received from the print server 4 (step S381), and when the print data is received (in the case of YES), the print data is stored in the storage portion (step S382), followed by going back to step S381 to repeat the processing. Alternatively, the print data is not received at step S381 (in the case of NO), it is determined whether a print command of the stored print data is made from the user (step S383). In other words, it is determined whether a password etc., is input by the user to perform a hold print.

When the printer 5a determines that no print command is made from the user at step S383 (in the case of NO), going back to step S401 shown in FIG. 40 described below. Alternatively, it is determined that the print command is made from the user at step S383 (in the case of YES), the print data is started to be printed (step S384), and it is determined whether the print data has all the pages (S385).

When it is determined that the print data does not have all the pages at step S385 (in the case of NO), the printer 5a requests the remaining pages of the print data to the print server 4 (step S386), followed by receiving the remaining pages of the print data from the print server 4 and continuing the print processing (S387). Alternatively, when it is determined that the print data has all the pages at step S385 (in the case of YES), moving to step S388.

In the processing of step S387, a flag indicative of the print completion may be transmitted to the print server 4 as the print completion notification when the printing is completed for each page, or for predetermined page.

Subsequently, the printer 5a determines whether there is a print error or a print stop command (step S388), and when there is a print error or a print stop command (in the case of YES), the printer 5a notifies the number of pages that the printing is completed to the print server 4 (step S389) and stops the printing (step S390), followed by going back to step S381 to repeat the processing. Alternatively, when there is no print error or print stop command at step S388 (in the case of NO), it is determined whether the printing is completed (step S391).

When it is determined that the printing is completed at step S391 (in the case of YES), the printer 5a transmits the print completion notification to the print server 4 (step S392), followed by going back to step S381 to repeat the processing. Alternatively, it is determined that the printing is not completed at step S391 (in the case of NO), going back to step S388 to repeat the processing.

Figure 40:
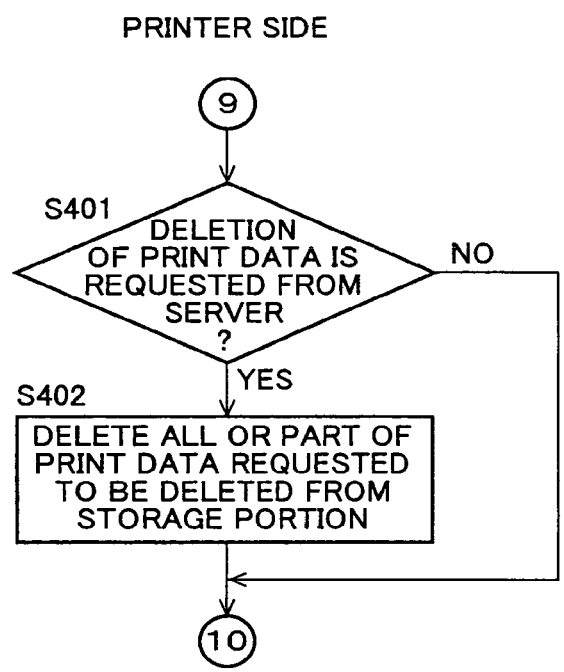
FIG. 40 is a flowchart for explaining a processing when no print command is made by a user at step S383 shown in FIG. 39.

FIG. 40 is a flowchart for explaining the processing when no print command is made by a user at step S383 shown in FIG. 39. First, the printer 5a determines whether the deletion request of the print data is made from the print server 4 (step S401), and when the deletion is requested (in the case of YES), all of, or part of the print data requested to delete is deleted from the storage portion (step S402), followed by going back to step S381 in FIG. 39 to repeat the processing. Alternatively, when no deletion request is made at step S401 (in the case of NO), going back to step S381 in FIG. 39 to repeat the processing.

In order to execute the flows illustrated in FIGS. 39 and 40, the printer 5a includes the storage portion 54 that stores print data transmitted from the print server 4; the operation portion 53 (corresponding to the print instruction portion of the present invention) that performs a print instruction for the print data stored in the storage portion 54; the image forming portion 51 (corresponding to a print portion of the present invention) that executes the print processing of the print data in response to the print instruction from the operation portion 53; and the print notification portion 522 that, when the print processing by the image forming portion 51 is interrupted, notifies information of the amount of the print data that the printing is completed before the print interruption.

In this way, even if the printing is interrupted, the printer notifies the print server of the amount of the data that the printing is completed, the print server can request other printers delete the amount of the data that the printing is completed. Then, it is possible that a user moves to other printers and prints the remaining print data that the printing is interrupted from other printers.

Further, even if the printing is interrupted by a print stop instruction by a user, or an error during printing, similarly, it is possible that the user moves to other printers and prints the remaining print data that the printing is interrupted from other printers.

Embodiments of the program and the recording medium storing data therein to realize the function of the print control of the present invention will be described. As the recording medium, specific examples of the recording medium, including a CD-ROM (-R/-RW), a magnet-optical disc, a DVD-ROM (-R/-RW/-RAM), a FD, a HD, a BD, a flash memory, a memory card, a memory stick, and other various kinds of ROMs or RAMs, is assumed. The computer is caused to execute functions as the apparatuses in each embodiment of the present invention described above, and the program for realizing the function of the print control is recorded on such a recording medium to deliver, and thereby the function is easily realized. In addition, a recording medium as described above is loaded to an information processing apparatus such as a computer to read the program by the information processing apparatus, or the program is stored on a recording medium provided in the information processing apparatus and read optionally, resulting that the function of the print control according to the present invention can be executed.

As described above, in the present invention, two or more print apparatuses near a user position on a network is caused to hold print data in advance, and therefore desired print data can be printed out no matter to which print apparatuses a user makes the print instruction. Further, print data in print apparatuses other than the print apparatus print-instructed by a user is automatically deleted, thus making it possible to use the storage capacity of the print apparatus efficiently while attaining the protection of such as confidential documents.

According to the present invention, a plurality of print apparatuses on a network are caused to hold print data beforehand, and therefore it is possible to perform a print output of desired print data no matter to which print apparatuses a user makes a print instruction. In addition, print data in print apparatuses other than the print apparatus print-instructed by a user is automatically deleted, thus making it possible to use the storage capacity of the print apparatus efficiently while attaining the protection of such as confidential documents.

In addition, two or more print apparatuses near a user position on a network are caused to hold print data in advance, and therefore desired print data can be printed out no matter to which print apparatuses a user makes a print instruction. Further, print data in other print apparatuses other than the print apparatus print-instructed by a user is automatically deleted, thus making it possible to use the storage capacity of the print apparatus efficiently while attaining the protection of such as confidential documents.

The invention claimed is:

1. A print control apparatus that is connected to a user terminal, a portable terminal, and a plurality of print apparatuses having a hold print function through a network, the user terminal being remotely located from the print control apparatus, comprising:

a user position information acquisition portion that acquires user position information of the portable terminal;

a print apparatus extraction portion that extracts two or more print apparatuses near the position of the portable terminal based on the acquired user position information;

a print data transmission portion that transmits print data received from the user terminal to each of the print apparatuses extracted by the print apparatus extraction portion to cause each of the print apparatuses to hold the print data; and a print data deletion instruction portion that, when a print notification of the print data is received from any one of each of the print apparatuses, instructs other print apparatuses other than the print apparatus to delete the print data, wherein the print data transmission portion transmits a part of the print data to each of the print apparatuses in accordance with a printing order of the print data to cause each of the print apparatuses to hold the part of the print data, and in a case where each of the print apparatuses holds the part of the print data, when a print notification of the print data is received from any one of each of the print apparatuses, the print data transmission portion transmits remaining data of the print data to the print apparatus.

2. A print control apparatus that is connected to a user terminal, a portable terminal, and a plurality of print apparatuses having a hold print function through a network, the user terminal being remotely located from the print control apparatus, comprising:

a user position information acquisition portion that acquires user position information of the portable terminal;

a print apparatus extraction portion that extracts two or more print apparatuses near the position of the portable terminal based on the acquired user position information;

a print data transmission portion that transmits print data received from the user terminal to each of the print apparatuses extracted by the print apparatus extraction portion to cause each of the print apparatuses to hold the print data; and a print data deletion instruction portion that, when a print notification of the print data is received from any one of each of the print apparatuses, instructs other print apparatuses other than the print apparatus to delete the print data, wherein when the print notification of the print data is received from any one of each of the print apparatuses, the print data deletion instruction portion instructs the other print apparatuses other than the print apparatus to delete an amount of the print data that a printing is completed by the print apparatus, based on information, included in the print notification, of the amount of the print data that the printing is completed by the print apparatus.

3. A print control apparatus that is connected to a user terminal, a portable terminal, and a plurality of print apparatuses having a hold print function through a network, the user terminal being remotely located from the print control apparatus, comprising:

a user position information acquisition portion that acquires user position information of the portable terminal;

a print apparatus extraction portion that extracts two or more print apparatuses near the position of the portable terminal based on the acquired user position information;

a print data transmission portion that transmits print data received from the user terminal to each of the print apparatuses extracted by the print apparatus extraction portion to cause each of the print apparatuses to hold the print data;

a print data deletion instruction portion that, when a print notification of the print data is received from any one of each of the print apparatuses, instructs other print apparatuses other than the print apparatus to delete the print data; and a storage portion that stores a history about the user position information acquired by the user position information acquisition portion, wherein when the user position information acquired by the user position information acquisition portion and previous user position information stored in the storage portion are different, the print apparatus extraction portion extracts new print apparatuses to be a transmission destination of the print data, the print apparatus extraction portion acquires information about a migration route of a user from the history of the user position information stored in the storage portion to extract the print apparatuses to be the transmission destination of the print data based on the information about the migration route, and the print data transmission portion weights an amount of the print data to be transmitted to each of the print apparatuses extracted by the print apparatus extraction portion based on the information about the migration route.

* * * * *